US012761988B2

(12) United States Patent
Singh et al.

(10) Patent No.: US 12,761,988 B2
(45) Date of Patent: Oct. 13, 2026

(54) MODULAR KERNEL ARRANGEMENT

(71) Applicant: Apple Inc., Cupertino, CA (US)

(72) Inventors: Rahul Narayan Singh, Milpitas, CA (US); Luc F. Dolcino, Nepean (CA); Vincent Pozzuoli, Montreal (CA); Catalin Giurca, Montreal (CA); Robin Burel, Brossard (CA); Sylvain Pilon, Gatineau (CA); Mamta Devi, Montreal (CA)

(73) Assignee: Apple Inc., Cupertino, CA (US)

(*) Notice: Subject to any disclaimer, the term of this patent is extended or adjusted under 35 U.S.C. 154(b) by 487 days.

(21) Appl. No.: 18/328,698

(22) Filed: Jun. 2, 2023

(65) Prior Publication Data

US 2024/0403102 A1 Dec. 5, 2024

(51) Int. Cl.

| | |
|---|---|
| ***G06F 9/54*** | (2006.01) |
| ***G06F 9/455*** | (2018.01) |
| ***G06F 13/00*** | (2006.01) |
| ***G06F 21/57*** | (2013.01) |
| ***G06F 21/62*** | (2013.01) |
| ***G06F 21/64*** | (2013.01) |
| ***G06Q 20/02*** | (2012.01) |
| ***G06Q 20/32*** | (2012.01) |
| ***G06Q 20/36*** | (2012.01) |

(52) U.S. Cl.

CPC .......... *G06F 9/545* (2013.01); *G06F 9/45558* (2013.01); *G06F 9/54* (2013.01); *G06F 13/00* (2013.01); *G06F 21/57* (2013.01); *G06F 21/62* (2013.01); *G06F 21/64* (2013.01); *G06Q 20/02* (2013.01); *G06Q 20/326* (2020.05); *G06Q 20/36* (2013.01)

(58) Field of Classification Search

None

See application file for complete search history.

(56) References Cited

U.S. PATENT DOCUMENTS

2005/0111364 A1* 5/2005 Hipp .................... G06F 9/4843 370/235

OTHER PUBLICATIONS

"Contactless Specifications for Payment Systems", Apr. 2019, EMVCo, Book A Architecture and General Requirements, Version 2.0. (Year: 2019).*

Balakrishnan et al., "Exploiting Value Locality in Physical Register Files", Dec. 5, 2003, Proceedings of the 36th Annual IEEE/ACM International Symposium on Microarchitecture, pp. 1-12. (Year: 2003).*

EMV, "Contactless Specifications for Payment Systems," Book A Architectural and Geneal Requirements, Version 2.10, Mar. 2021, 119 Pages.

EMV, "Contactless Specifications for Payment Systems," Book B Entry Point Specification, Version 2.10, Mar. 2021, 58 Pages.

* cited by examiner

*Primary Examiner* — Qing Yuan Wu

(74) *Attorney, Agent, or Firm* — Kilpatrick Townsend & Stockton LLP

(57) ABSTRACT

The present application relates to devices and components including apparatus, systems, and methods to manage kernels within a secure element for performance of a data transfer.

18 Claims, 12 Drawing Sheets

MODULAR KERNEL ARRANGEMENT

BACKGROUND

As mobile device technology has developed, utilizing mobile devices for performing data transfers among accounts associated with the mobile devices has only increased. For example, a mobile device can facilitate a transfer of data between a first account maintaining a first set of values and a second account maintaining a second set of values.

DETAILED DESCRIPTION

Figure 1:
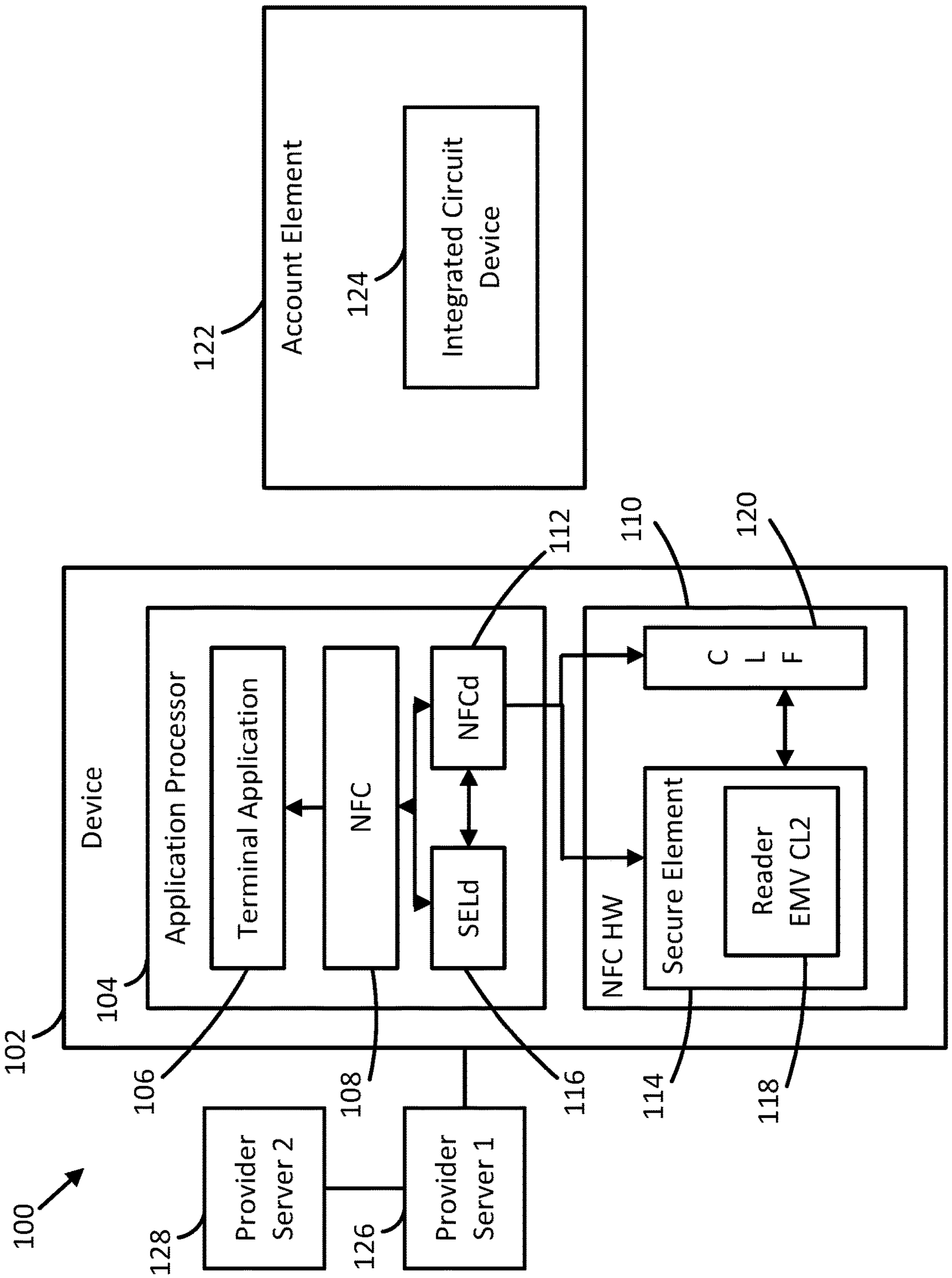
FIG. 1 illustrates an example data transfer system arrangement in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Embodiments described herein may relate to the transfer of data between accounts facilitated by a device. For example, the device may include a secure element that can securely store and process data to be utilized for facilitating the data transfers. Specifically, the secure element may include one or more kernels that are utilized to facilitate the data transfers between the accounts. The kernels may be included in a modular fashion such that any changes to a kernel, any registration of a new kernel, and/or any deregistration of a kernel do not affect binaries of the other kernels registered with an entry point of the secure element. By maintaining the binaries of the kernels without being affected by changes to other kernels, core signatures of the kernels that are generated based on the binaries of the kernels can remain unchanged.

In order to ensure the security of the data being utilized for the data transfer, standards have been developed to define procedures to be utilized for protecting the data. An example of these standards is the Europay, Mastercard, Visa (EMV) specification that defines procedures for data transfers. The EMVCo standards body may test, or define tests for, devices (or portions thereof), such as the secure element in the described embodiments, to certify that the devices meet the EMV specification. The EMVCo maintains core signatures corresponding to certifications to make sure that changes have not been made to the device since the certification. In instances where the core signatures corresponding to a certified device (or portions thereof) are changed, the device (or portions thereof) with the changed core signatures may require recertification.

In legacy approaches of data transfers utilizing a secure element, a change to any kernel of the secure element would cause changes to the core signatures corresponding to all of the kernels. In these legacy approaches, a change to the core signatures requires all of the kernels of the secure element to be recertified. In contrast, approaches described herein may limit the changes to the core signatures to the specific kernel being changed, as opposed to all of the kernels in the secure element. For example, where a secure element having a first kernel and a second kernel has only the first kernel updated, the core signature corresponding to the first kernel may change while the core signature corresponding to the second kernel may remain the same as prior to the change. Accordingly, only the kernel experiencing the change may require recertification while the other kernels may not require recertification. Limiting the recertification to a kernel experiencing a change may save time and money for the recertification.

The data transfer, as described herein, may involve transfer of data between two different accounts. A first account of the accounts may be associated with a user device, such as the smartphone. A second account of the accounts may be associated with an account element that can provide data to identify the second account. The user device may receive the data from the account element to identify the second account. The user device may communicate with a first service provider that manages the first account and/or a second service provider that manages the second account to facilitate transfer of data between the first account and the second account. The transfer of data may result in changes in a first value associated with the first account and a second value associated with the second account.

The user device associated with the first account may include a secure element for facilitating the data transfer between the accounts. The secure element of the user device may store and operate one or more kernels to facilitate the data transfer, where each of the one or more kernels may be associated with a corresponding service provider that maintains accounts and/or an account element corresponding to accounts. Each of the kernels may define operations and/or data to be utilized for performance of the data transfer.

The secure element of the user device may further store and operate an entry point that manages the kernels on the secure element. The entry point may provide a modular connection to the kernels. The modular connection of the entry point with the kernels may allow for additional kernels to be registered with the entry point, kernels to be deregistered from the entry point, and/or kernels stored on the secure element to be updated without affecting core signatures of other stored kernels that are not being changed. In instances where the secure element (or portions thereof) is certified by a standards body, the core signatures of certified secure element (or portions thereof) may be stored by the standards body. The standards body may require the secure element (or portions thereof) to be recertified each time that a core signature is changed. Limiting the core signature changes to the kernels being changed (as described throughout this disclosure) may limit the recertification required by the standards body to apply only to the kernels that have changed core signatures rather than having the recertification being required for the entire secure element and/or all of the kernels stored on the secure element. Recertification for only a portion of the kernels stored on a secure element may be cheaper and/or faster than having all the kernels stored on the secure element and/or the entire secure element being recertified.

The entry point may assign virtual kernel identifiers to the kernels to facilitate the modular connection between the entry point and the kernels. In particular, the entry point may assign a unique virtual kernel identifier to each of the kernels. In some embodiment, the entry point may assign a unique virtual kernel identifier to each configuration of the kernels, such that a kernel with a first configuration may be assigned a first unique virtual kernel identifier and the same kernel with a second configuration may be assigned a second unique virtual kernel identifier. The virtual kernel identifiers may map an application identifier and/or an account element kernel identifier from an account element to a kernel identifier for a corresponding kernel. The entry point may utilize the virtual kernel identifiers to determine which kernel is to be utilized to facilitate a transfer of data based on the account element being utilized for the transaction.

FIG. 1 illustrates an example data transfer system arrangement 100 in accordance with some embodiments. For example, the data transfer system arrangement 100 illustrates elements that may facilitate a data transfer between accounts.

The data transfer system arrangement 100 may include a device 102. The device 102 may facilitate a data transfer between accounts. In some embodiments, the device 102 may comprise a mobile device, such as a smartphone.

The device 102 may include an application processor 104. The application processor 104 may execute one or more of applications of the device 102. For example, the application processor 104 may execute a terminal application 106. The terminal application 106 may cause user interfaces to be displayed on a display of the device 102. A user interface of the device 102 may provide for input of information related to data transfer. For example, the information that can be input may include a data transfer amount for the data transfer. The terminal application 106 may initiate a data transfer procedure based on the input of the information in some embodiments.

The application processor 104 may execute a near field communication (NFC) application 108. The NFC application 108 may facilitate NFC with the device 102. For example, the NFC application 108 may facilitate NFC with elements and/or other devices within a proximity of the device 102.

The device 102 may include NFC hardware (HW) 110. The NFC HW 110 may comprise an NFC chip and/or an antenna that facilitates NFC with other elements and/or other devices within a proximity of the device 102. The NFC HW 110 and the NFC application 108 may facilitate NFC via methods that are well known in the art. The application processor 104 may further include an NFC daemon (NFCd) 112 that can be executed by the application processor 104 in the background to facilitate operation of the NFC HW 110.

The device 102 may further include a secure element 114. The secure element 114 may be located within the NFC HW 110. The application processor 104 may further include a secure element manager daemon (SELd) 116 that facilitates operation of the secure element 114. The secure element 114 may comprise a hardware device that can securely store and process data. In particular, the secure element 114 may prevent the application processor 104 from accessing at least a portion of the data processed and/or stored by the secure element 114 in an unencrypted format. At least a portion of the data processed and/or stored by the secure element 114 may be encrypted prior to the portion of the data being transmitted outside of the secure element 114, where other elements of the device 102 (such as the application processor 104) lack the ability to decrypt the encrypted data (such as by lacking access to a key to be utilized to decrypt the encrypted data) transmitted by the secure element 114. In some embodiments, the secure element 114 may run Java Card applets.

The secure element 114 may operate one or more kernels, as is described further throughout this disclosure. The secure element 114 may execute the kernels to facilitate the data transfer. Each of the kernels may have dedicated memory, where the secure element 114 may provide firewalls between the data stored for each of the kernels such that a kernel (and/or operations related to the kernel) may be prevented from accessing data associated with the other kernels.

In some embodiments, the secure element 114 may be tested and certified by a certification entity. For example, an entity (such as the EMVCo) may test the secure element 114 to verify that the secure element 114 meets specified parameters (such as parameters specified in Europay, Mastercard, and Visa (EMV) specifications). The entity can certify that the secure element 114 (or portions thereof) meets the specified parameters. In some embodiments, the certification of the secure element 114 may indicate that the secure element 114 adequately protects the data stored on the secure element 114 in accordance with the specified parameters. In some instances, the secure element 114 (or portions thereof) may need to be recertified when changes are made to the secure element 114, as is described further throughout this disclosure.

The secure element 114 may include a reader 118. The reader 118 may be utilized by the secure element 114 to read data from other elements via NFC. In some embodiments, the reader 118 may be certified to meet specified parameters (such as parameters specified in EMV specifications).

The NFC HW 110 may include a contactless frontend (CLF) 120. The CLF 120 may be an interface for facilitating contactless communication (such as NFC) with other elements. The CLF 120 may include and/or be coupled to an antenna that facilitates contactless communication. The CLF 120 may be coupled to the secure element 114 without other processors (including the application processor 104) intervening between the CLF 120 and the secure element 114. Therefore, the secure element 114 may receive data from the CLF 120 which the application processor 104 may be unable to access. This can allow at least some data obtained from NFC to be securely processed and/or stored by the secure element 114 without other processors of the device 102 (including the application processor 104) being able to access the unencrypted data.

The data transfer system arrangement 100 may include an account element 122. The account element 122 may store data related to an account. In some embodiments, the data may include an identifier of the account that can be utilized for identifying the account. Further, the account element 122 may have the ability to engage in NFC to share the data stored by the account element 122. In the illustrated embodiment, the account element 122 includes an integrated circuit device 124. In some embodiments, the integrated circuit device 124 may comprise a radio frequency identification (RFID) tag. The integrated circuit device 124 can store the information related to the account. The integrated circuit device 124 may share the data with an NFC-enabled device (such as the device 102) when the account element 122 is within a proximity of the device.

The data transfer system arrangement 100 may further include a first provider server 126 and a second provider server 128. The first provider server 126 may maintain a first account associated with the device 102 or the account element 122. The second provider server 128 may maintain a second account associated with the other of the device 102 or the account element 122. The first provider server 126 may maintain a value associated with the first account and the second provider server 128 may maintain a value associated with the second account. The data transfer facilitated by the device 102 may result in a data transfer between the first provider server 126 and the second provider server 128 that results in the value associated with the first account and the value associated with the second account changing in accordance with the data transfer.

The device 102 may initiate a data transfer procedure. For example, the application processor 104, via the terminal application 106, may receive data that indicates that a data transfer has been requested. In some embodiments, the data may include a value associated with the data transfer. The application processor 104 may indicate to the secure element 114 that a data transfer is to be performed.

Based on the indication that the data transfer is to be performed, the secure element 114 may enable NFC of the device 102 to discover any account elements within the proximity of NFC for the device 102. In the illustrated embodiment, the secure element 114 may discover that the account element 122 is within the proximity of the device 102. The secure element 114 may obtain data related to an account associated with the account element 122 from the integrated circuit device 124. For example, the secure element 114 may obtain the data from the integrated circuit device 124 via the CLF 120, where the data obtained from the integrated circuit device 124 is received by the secure element 114 without the application processor 104 being able to access the unencrypted data from the account element 122.

The secure element 114 may determine a kernel to be utilized for the data transfer related to the account element 122. The secure element 114 may utilize the kernel to receive the data from the integrated circuit device 124 and process the data accordingly. In some embodiments, the kernel may be associated with a provider that maintains the first provider server 126 or a provider that maintains the second provider server 128.

The secure element 114 and/or the application processor 104 may provide data for the data transfer to the first provider server 126. The first provider server 126 may utilize the data provided by the secure element 114 and/or the application processor 104 to facilitate the data transfer between the accounts maintained by the first provider server 126 and the second provider server 128. The data transfer may result in the values of the corresponding accounts maintained by the first provider server 126 and the second provider server 128 being changed according to the data transfer.

The data transfer system arrangement 100 is described with contactless exchange of data between the device 102 and the account element 122 via NFC in the illustrated embodiment. In other embodiments, the data transfer system arrangement 100 may implement other approaches for exchanging data between devices and account elements (such as manual entry of data from the account element 122, magnetic strip scanning to retrieve data from the account element 122, optical character recognition to retrieve data from the account element 122, wired approaches of obtaining data from the account element 122, and/or other wireless approaches of obtaining data from the account element 122) known in the art. In these embodiments, the secure element 114 may be located in hardware utilized for the approach of exchanging data such that the secure element 114 may obtain the data without the application processor 104 having access to the data.

Figure 2:
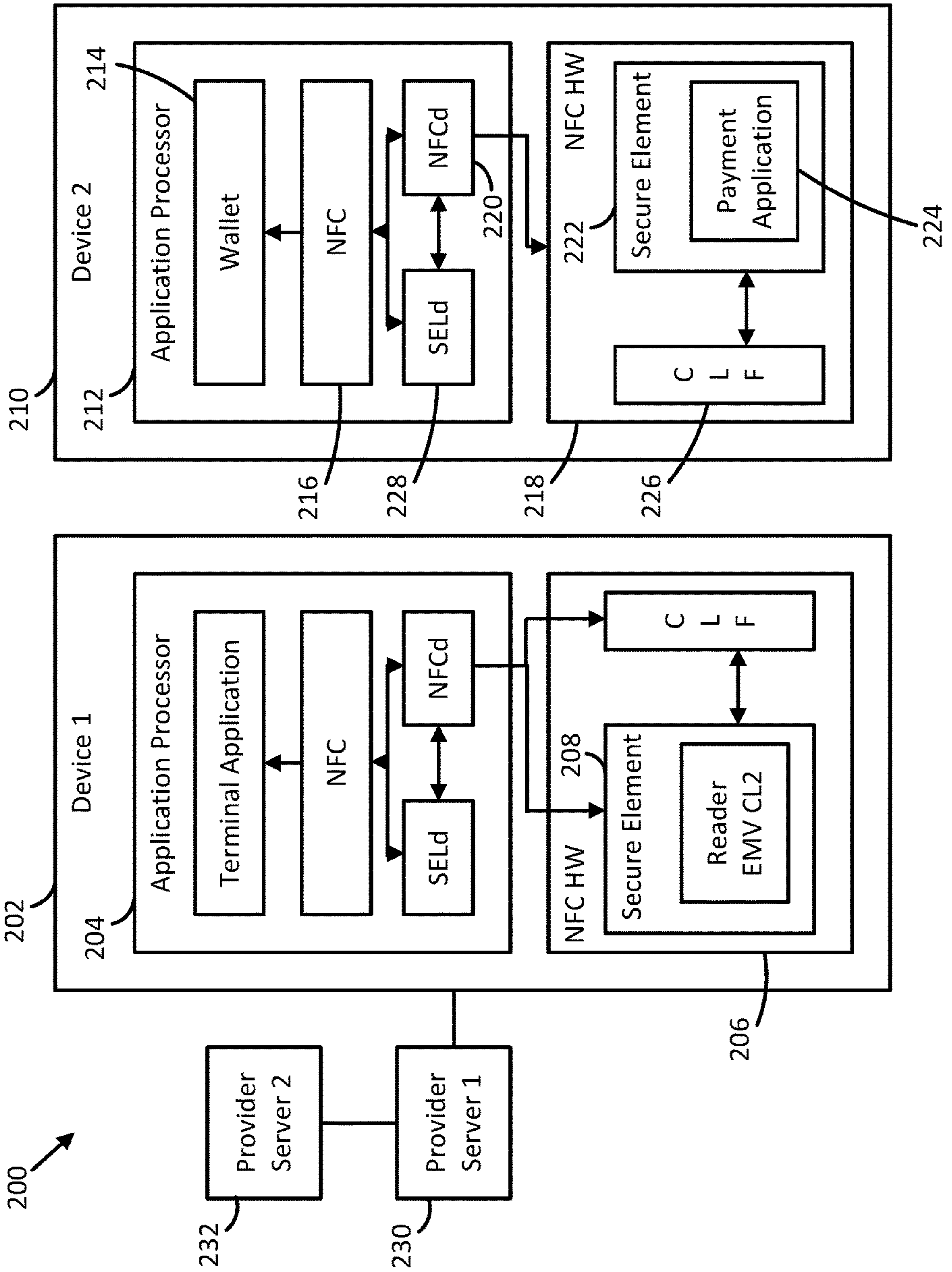
FIG. 2 illustrates another example data transfer system arrangement in accordance with some embodiments.

FIG. 2 illustrates another example data transfer system arrangement 200 in accordance with some embodiments. For example, the data transfer system arrangement 200 illustrates elements that may facilitate a data transfer between accounts.

The data transfer system arrangement 200 may include one or more the features of the data transfer system arrangement 100 (FIG. 1). For example, the data transfer system arrangement 200 may include a first device 202 that includes one or more the features of the device 102 (FIG. 1). The first device 202 may include an application processor 204 and NFC HW 206. The application processor 204 may include one or more the features of the application processor 104 (FIG. 1) and the NFC HW 206 may include one or more the features of the NFC HW 110 (FIG. 1). The NFC HW 206 may include a secure element 208. The secure element 208 may include one or more of the features of the secure element 114 (FIG. 1).

The data transfer system arrangement 200 may include a second device 210. The second device 210 may act as an account element in the illustrated embodiment. The second device 210 may include an application processor 212. The application processor 212 may include one or more the features of the application processor 104 (FIG. 1). The application processor 212 may execute a wallet application 214. The wallet application 214 may store data associated with one or more accounts. The wallet application 214 may cause the second device 210 to display a user interface that can allow selection of an account from the one or more accounts to be utilized for the data transfer.

The second device 210 may include an NFC application 216, NFC HW 218, and an NFCd 220. The NFC application 216 may include one or more the features of the NFC application 108 (FIG. 1). The NFC HW 218 may include one or more the features of the NFC HW 110 (FIG. 1). The NFCd 220 may include one or more the features of the NFCd 112 (FIG. 1). The NFC application 216, the NFC HW 218, and the NFCd 220 may facilitate NFC with the second device 210.

The second device 210 may include a secure element 222 and a SELd 228. The secure element 222 may include one or more of the features of the secure element 114 (FIG. 1). The SELd 228 may include one or more of the features of the SELd 116 (FIG. 1). The secure element 222 may securely store and/or process data related to the one or more accounts associated with the wallet application 214. The secure element 222 may further execute a payment application 224. The payment application 224 may provide for sharing of the data stored by the secure element 222 to other devices via NFC. The NFC HW 218 may further include a CLF 226 that can be utilized for NFC. The CLF 226 may include one or more of the features of the CLF 120 (FIG. 1).

The data transfer system arrangement 200 may further include a first provider server 230 and a second provider server 232. The first provider server 230 may include one or more of the features of the first provider server 126 (FIG. 1). The second provider server 232 may include one or more of the features of the second provider server 128 (FIG. 1). The first provider server 230 may maintain a first account associated with the first device 202 or the second device 210. The second provider server 232 may maintain a second account associated with the other of the first device 202 or the second device 210. The first provider server 230 may maintain a value associated with the first account and the second provider server 232 may maintain a value associated with the second account. The data transfer facilitated by the first device 202 may result in a data transfer between the first provider server 230 and the second provider server 232 that results in the value associated with the first account and the value associated with the second account changing in accordance with the data transfer.

The first device 202 may initiate a data transfer procedure. For example, the application processor 204 may receive data that indicates that a data transfer has been requested. In some embodiments, the data may include a value associated with the data transfer. The application processor 204 may indicate to the secure element 208 that a data transfer is to be performed.

Based on the indication that the data transfer is to be performed, the secure element 208 may enable NFC of the first device 202 to discover any account elements within the proximity of NFC for the first device 202. In the illustrated embodiment, the secure element 208 may discover that the second device 210 is within the proximity of the first device 202.

The wallet application 214 may present a user interface that allows an account to be selected from the one or more accounts associated with the wallet application 214 to be utilized for the data transfer. In particular, an account may be selected in the wallet application 214 to be utilized for the data transfer. The wallet application 214 may operate with the secure element 222 to share data related to the selected account via NFC.

The secure element 208 may obtain data related to the selected account from the second device 210. For example, the secure element 208 may obtain the data from the second device 210, where the data obtained from the second device 210 is received by the secure element 208 without the application processor 204 and the application processor 212 being able to access the unencrypted data from the secure element 222.

The secure element 208 may determine a kernel to be utilized for the data transfer related to the selected account of the second device 210. The secure element 208 may utilize the kernel to receive the data from the second device 210 and process the data accordingly. In some embodiments, the kernel may be associated with a provider that maintains the first provider server 230 or a provider that maintains the second provider server 232.

The secure element 208 and/or the application processor 204 may provide data for the data transfer to the first provider server 230. The first provider server 230 may utilize the data provided by the secure element 208 and/or the application processor 204 to facilitate the data transfer between the accounts maintained by the first provider server 230 and the second provider server 232. The data transfer may result in the values of the corresponding accounts maintained by the first provider server 230 and the second provider server 232 being changed according to the data transfer.

The data transfer system arrangement 200 is described with contactless exchange of data between the first device 202 and the second device 210 via NFC in the illustrated embodiment. In other embodiments, the data transfer system arrangement 200 may implement other approaches for exchanging data between the devices (such as manual entry of data from the second device 210, magnetic strip scanning to retrieve data from the second device 210, optical character recognition to retrieve data from the second device 210, wired approaches of obtaining data from the second device 210, and/or other wireless approaches of obtaining data from the second device 210) known in the art. In these embodiments, the secure element 208 may be located in hardware utilized for the approach of exchanging data such that the secure element 208 may obtain the data without the application processor 204 having access to the data.

In some embodiments, the data transfer described in relation to FIG. 1 and FIG. 2 may comprise a financial transaction between two accounts. For example, a first provider server (such as the first provider server 126 (FIG. 1) and/or the first provider server 230 (FIG. 2)) may maintain a first financial account (such as a bank account, a credit card account, or another financial account that can be utilized for performing transactions) associated with one of the devices (such as the first device 102 (FIG. 1), the first device 202 (FIG. 2), and/or the second device 210 (FIG. 2)) and/or an account element (such as the account element 122 (FIG. 1)). A second provider server (such as the second provider server 128 (FIG. 1) and/or the second provider server 232 (FIG. 2)) may maintain a second financial account associated with another one of the devices and/or the account element. The data transfer may result in corresponding changes of the values associated with each the accounts corresponding to the financial transaction. In other embodiments, the data transfer may include other types of data transfers, such as other exchanges of data between accounts maintained by the first provider server and the second provider server.

Figure 3:
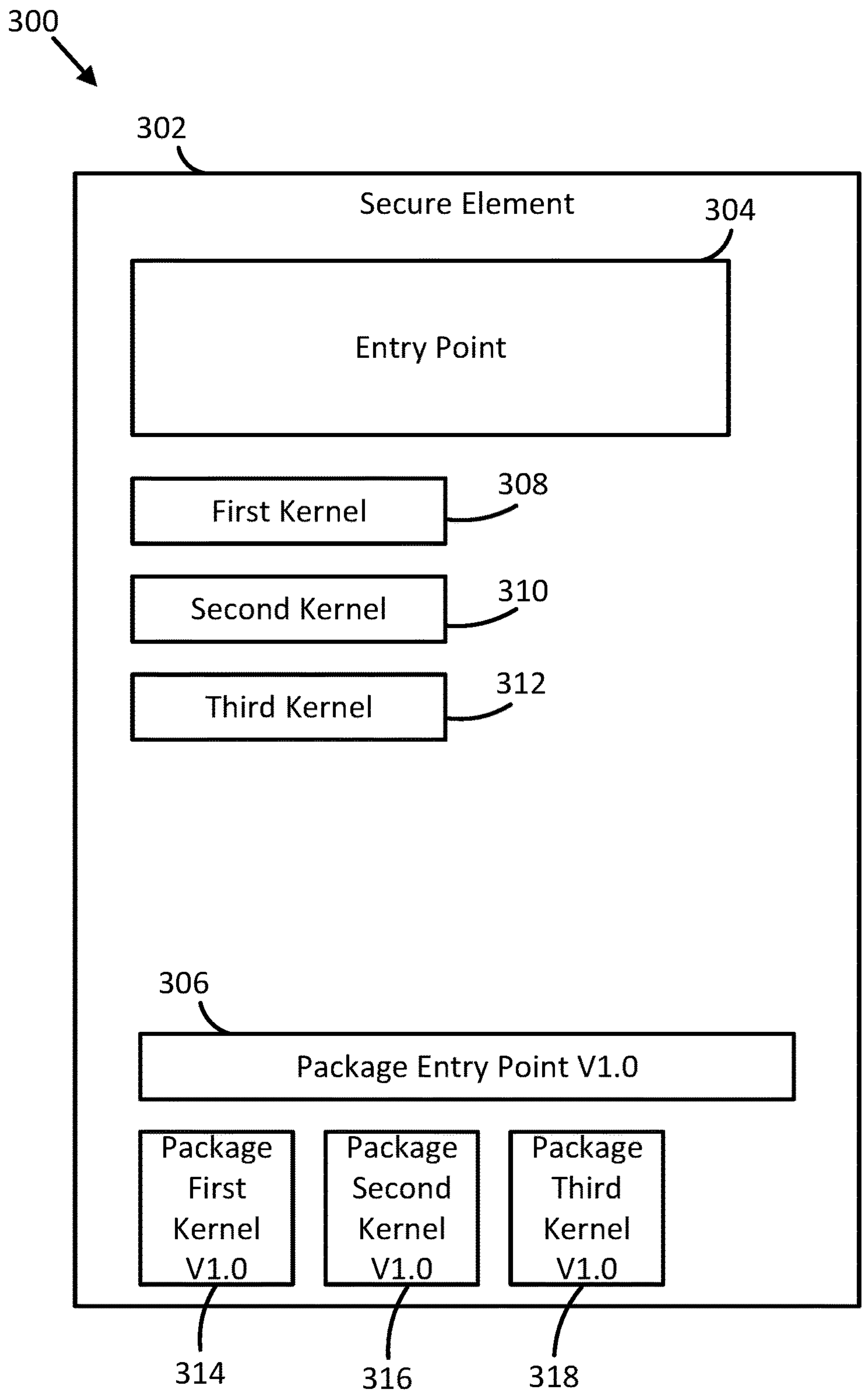
FIG. 3 illustrates an example secure element arrangement in accordance with some embodiments.

FIG. 3 illustrates an example secure element arrangement 300 in accordance with some embodiments. For example, the secure element arrangement 300 illustrates elements that may be included in a secure element. The secure element arrangement 300 illustrates example elements that may be implemented by the secure element 114 (FIG. 1), the secure element 208 (FIG. 2), and/or the secure element 222 (FIG. 2).

The secure element arrangement 300 may include a secure element 302. The secure element 302 may include one or more of the features of the secure element 114 (FIG. 1), the secure element 208 (FIG. 2), and/or the secure element 222 (FIG. 2). The secure element 302 may be implemented in a device, such as the device 102 (FIG. 1), the first device 202 (FIG. 2), and/or the second device 210 (FIG. 2). The secure element 302 may comprise dedicated hardware and/or may implement java card technology.

The secure element 302 may be capable of assigning memory of the secure element 302 to different elements implemented by the secure element 302 and implementing firewalls between the different memory assignments such that each memory assignment can be accessed by the corresponding element to which the memory is assigned and is prevented from being accessed by at least some of the other elements implemented by the secure element 302. Accordingly, the implementing of firewalls between the assigned memory may prevent and/or reduce the risk of data stored within the memory being accessed by unauthorized users. The secure element 302 may further encrypt any data being transmitted from the secure element 302 related to at least a portion of the assigned memories, such that other unauthorized elements outside of the secure element (such as the application processor 104 (FIG. 1), the application processor 204 (FIG. 2), and/or the application processor 212 (FIG. 2)) are unable to access the data in an unencrypted format.

The secure element 302 may store and operate an entry point 304. The entry point 304 may comprise an application operated by the secure element 302 to manage kernels stored on the secure element 302. For example, the entry point 304 may manage a mapping of an application identifier and/or account element kernel identifier received from an account element (such as the account element 122 (FIG. 1) and/or the second device 210 (FIG. 2)) to a respective kernel. The secure element 302 may generate virtual kernel identifiers for each of the kernels stored by the secure element 302, where the virtual kernel identifiers may map each application identifier and/or account element kernel identifier to each corresponding kernel stored by the secure element 302. The secure element 302 may further store an entry point software package 306 corresponding to the entry point 304.

The secure element 302 may store and operate one or more kernels. In particular, the secure element 302 stores a first kernel 308, a second kernel 310, and a third kernel 312 in illustrated embodiment. The secure element 302 may further store software packages corresponding to each of the kernels. For example, the secure element 302 stores a first kernel software package 314 corresponding to the first kernel 308, a second kernel software package 316 corresponding to the second kernel 310, and a third kernel software package 318 corresponding to the third kernel 312.

The entry point 304 may utilize a corresponding kernel to perform a data transfer procedure. For example, the entry point 304 may receive a request to perform a data transfer, where the request may include an application identifier and/or an account element kernel identifier.

The entry point 304 may determine a virtual kernel identifier corresponding to the application identifier and/or the account element kernel identifier. The virtual kernel identifier may provide a mapping from the application identifier and/or the account element kernel identifier to a corresponding kernel. In some embodiments, the virtual kernel identifier may further provide a mapping from the application identifier and/or the account element kernel identifier to a corresponding configuration for the corresponding kernel. The entry point 304 may have previously assigned the virtual kernel identifier to the corresponding kernel, such as the entry point 304 assigning the virtual kernel identifier to the kernel when the kernel registers with the entry point 304 and/or the kernel is updated.

The entry point 304 may then determine which of the kernels is to be utilized for the data transfer based on the virtual kernel identifier. In particular, the entry point 304 may determine which of the first kernel 308, the second kernel 310, or the third kernel 312 corresponds to the virtual kernel identifier in the illustrated embodiment. The entry point 304 may then utilize the determined kernel in performance of the data transfer. For example, the determined kernel may provide one or more operations to be performed by the entry point 304 and/or the secure element 302 for the data transfer.

The kernels may interact with the entry point 304 in a modular approach. In particular, kernels may register or deregister with the entry point 304 without the other kernels being affected. Further, kernels may be updated (such as by updating the corresponding software package) without affecting the other kernels. For example, each of the kernels may have corresponding binary. Changes to a kernel may affect the binary of the kernel without affecting binaries of the other kernels. Additionally, the entry point 304 may have corresponding binary where changes to the kernels do not affect the binary of the entry point 304. The virtual kernel identifier may enable the modular approach through the mapping by the virtual kernel identifiers.

Figure 4:
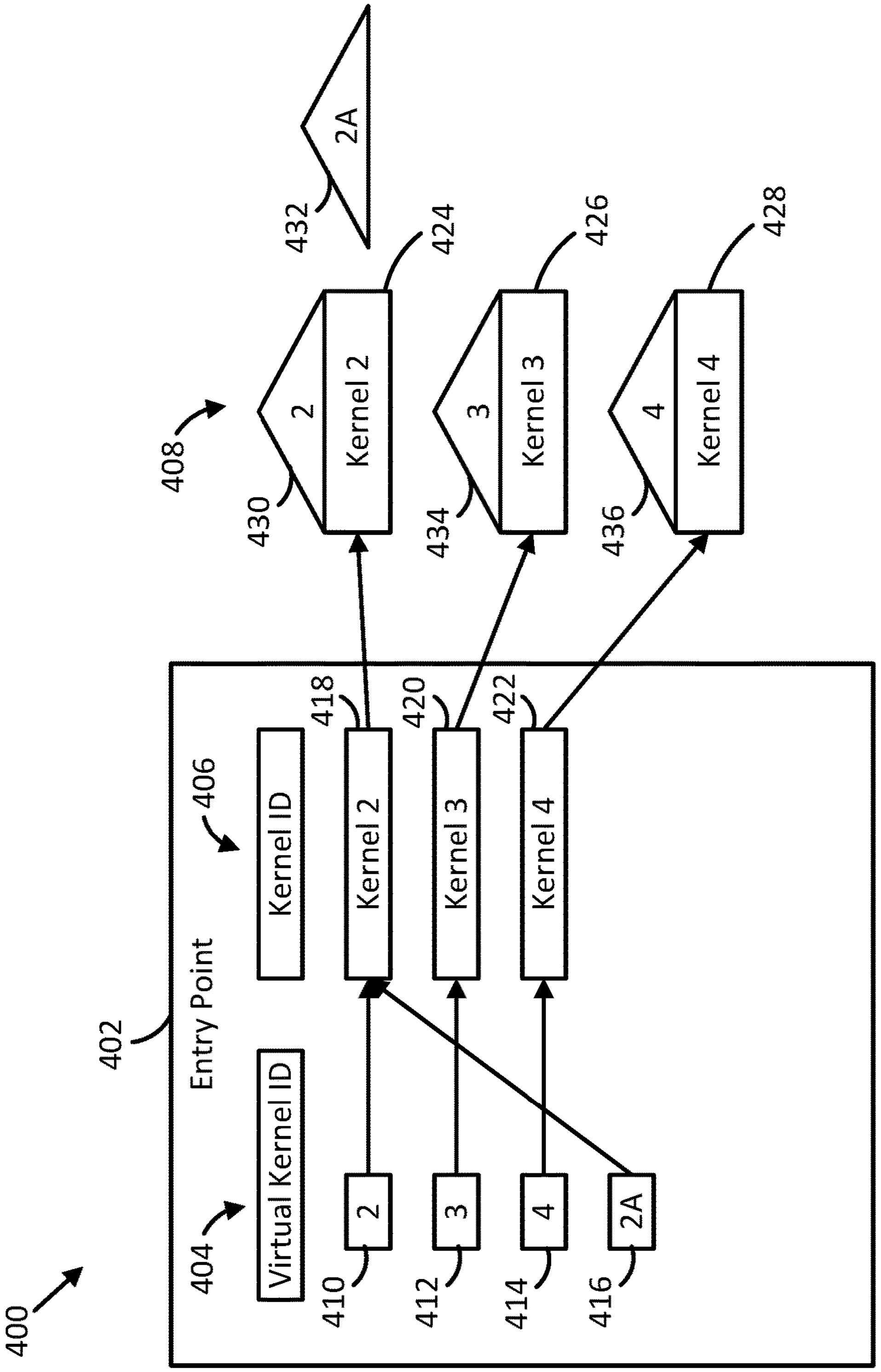
FIG. 4 illustrates an example virtual kernel identifier mapping arrangement in accordance with some embodiments.

FIG. 4 illustrates an example virtual kernel identifier mapping arrangement 400 in accordance with some embodiments. For example, the virtual kernel identifier mapping arrangement 400 illustrates an example arrangement that may be implemented by a secure element, such as the secure element 114 (FIG. 1), the secure element 208 (FIG. 2), and/or the secure element 222 (FIG. 2).

The virtual kernel identifier mapping arrangement 400 may include an entry point 402. The entry point 402 may include one or more of the features of the entry point 304 (FIG. 3). The entry point 402 may be executed by a secure element, such as the secure element 114, the secure element 208, and/or the secure element 222.

The entry point 402 may maintain a mapping of virtual kernel identifiers 404 to kernel identifiers 406 corresponding to kernels 408 stored by the secure element. For example, the virtual kernels identifiers 404 may be utilized by the entry point for mapping an application identifier and/or an account element kernel identifier received from an account element (such as the account element 122 (FIG. 1) and/or the second device 210 (FIG. 2)) to a corresponding kernel and/or a corresponding configuration for a kernel.

The virtual kernel identifiers 404 may include a first virtual kernel identifier 410, a second virtual kernel identifier 412, a third virtual kernel identifier 414, and fourth virtual kernel identifier 416 in the illustrated embodiment. Each of the virtual kernel identifiers 404 may be associated with a corresponding application identifier and/or account element kernel identifier received from an account element. For example, the first virtual kernel identifier 410 may correspond to a first application identifier and/or account element kernel identifier, the second virtual kernel identifier 412 may correspond to a second application identifier and/or account element kernel identifier, the third virtual kernel identifier 414 may correspond to a third application identifier and/or account element kernel identifier, and the fourth virtual kernel identifier 416 may correspond to a fourth application identifier and/or account element kernel identifier. The entry point 402 may receive an application identifier and/or an account element kernel identifier and determine which of the virtual kernel identifiers 404 correspond to the application identifier and/or the account element kernel identifier.

The kernel identifiers 406 may include a first kernel identifier 418, a second kernel identifier 420), and a third kernel identifier 422 in the illustrated embodiment. The virtual kernel identifiers 404 may be mapped to the kernel identifiers 406. For example, one or more of the virtual kernel identifiers 404 may be mapped to each of the kernel identifiers 406. In the illustrated embodiment, the first virtual kernel identifier 410 and the fourth virtual kernel identifier 416 is mapped to the first kernel identifier 418, the second virtual kernel identifier 412 is mapped to the second kernel identifier 420, and the third virtual kernel identifier 414 is mapped to the third kernel identifier 422. For each determined virtual kernel 20) identifier, the entry point 402 may determine to which one of the kernel identifiers 406 the determined virtual kernel identifier is mapped. For example, the entry point 402 may determine which one of the virtual kernel identifiers 404 corresponds to a received application identifier and/or account element kernel identifier, and then determine to which one of the kernel identifiers 406 the determined virtual kernel identifier is mapped.

The kernels 408 may include a first kernel 424, a second kernel 426, and a third kernel 428 in the illustrated embodiment. Each of the kernels 408 may have one or more corresponding configurations. For example, the first kernel 424 has a corresponding first configuration 430) and second configuration 432 in the illustrated embodiment. The second kernel 426 has a corresponding third configuration 434. The third kernel 428 has a corresponding fourth configuration 436. Each of the kernels 408 may be configured with one of the corresponding configurations for performance of a data transfer procedure.

In some instances, one or more of the virtual kernel identifiers 404 may additionally be mapped to a corresponding configuration for the corresponding kernel. For example, the first virtual kernel identifier 410 is mapped to the first configuration 430 for the first kernel 424 and the fourth virtual kernel identifier 416 is mapped to the second configuration 432 for the first kernel 424 in the illustrated embodiment. The entry point 402 may determine that the configuration to be utilized for the kernel based on the virtual kernel identifier for a data transfer procedure. The entry point 402 may cause the kernel to be configured with the determined configuration for performance of the data transfer. The binary of the kernel may remain unchanged through any reconfiguration of the configuration for the kernel.

Having kernels being capable of being configured with multiple configurations may provide reduced memory usage as compared to legacy approaches where each kernel implements only a single configuration. For example, a kernel may be reused with different configurations for multiple application identifiers and/or multiple account element kernel identifiers rather than having to store multiple copies of the kernel for each of the multiple application identifiers and/or multiple account element kernel identifiers. As memory can be limited in secure elements, using less memory can be highly beneficial.

Figure 5:
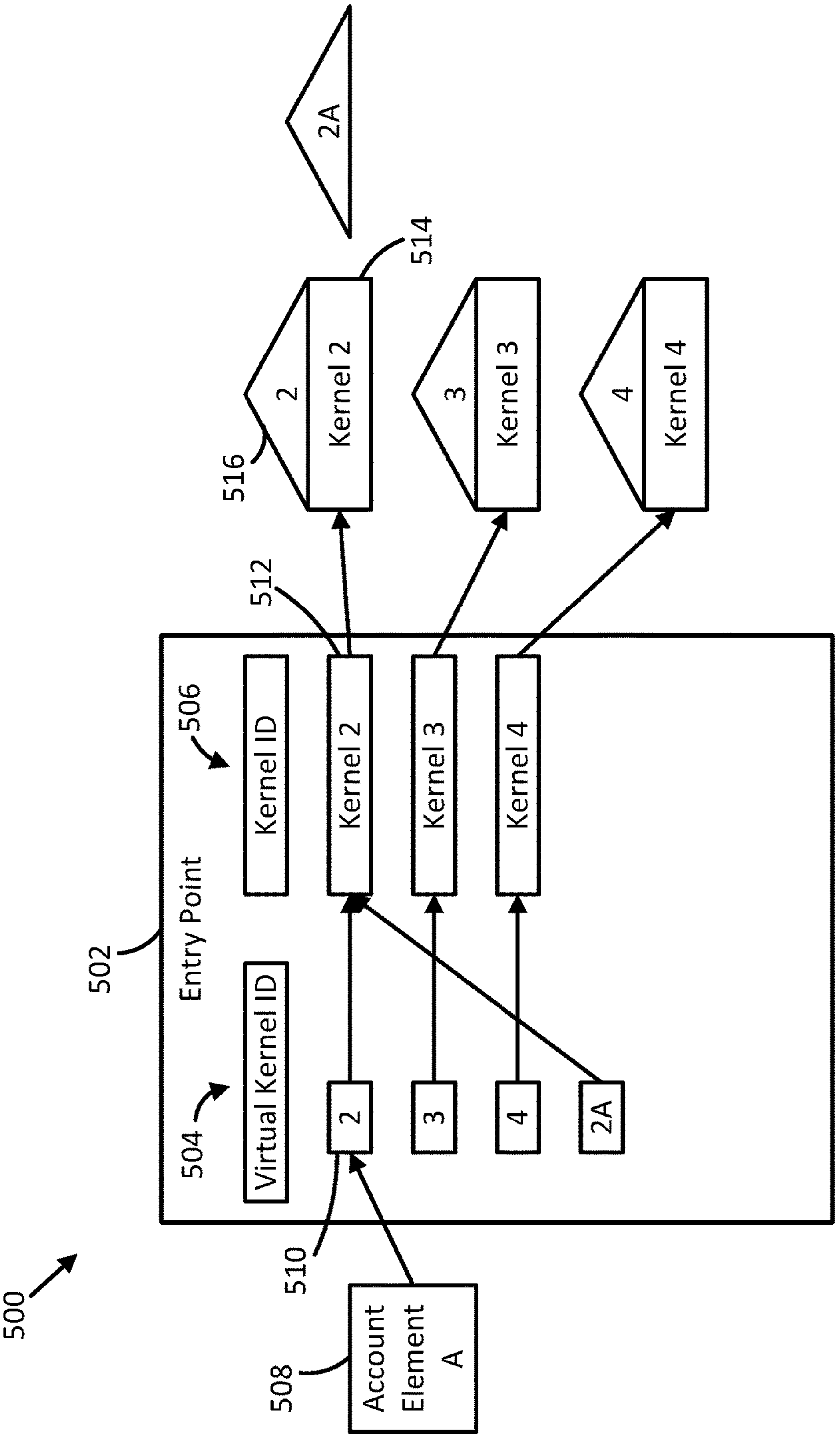
FIG. 5 illustrates another example virtual kernel identifier mapping arrangement in accordance with some embodiments.

FIG. 5 illustrates another example virtual kernel identifier mapping arrangement 500 in accordance with some embodiments. For example, the virtual kernel identifier mapping arrangement 500 illustrates an example arrangement that may be implemented by a secure element, such as the secure element 114 (FIG. 1), the secure element 208 (FIG. 2), and/or the secure element 222 (FIG. 2).

The virtual kernel identifier mapping arrangement 500 may include one or more of the features of the virtual kernel identifier mapping arrangement 400 (FIG. 4). For example, the virtual kernel identifier mapping arrangement 500 may include an entry point 502. The entry point 502 may include one or more of the features of the entry point 402 (FIG. 4). The entry point 502 may maintain a mapping of virtual kernel identifiers 504 to kernel identifiers 506 and/or configurations for kernels.

The virtual kernel identifier mapping arrangement 500 may include an account element representation 508. The account element representation 508 may represent an account element (such as the account element 122 (FIG. 1) and/or the second device 210 (FIG. 2)) being located with a proximity of a device (such as the device 102 (FIG. 1) and/or the first device 202 (FIG. 2)). The account element may provide an application identifier and/or an account element kernel identifier to the device. The account element representation 508 may represent the application identifier and/or the account element kernel identifier being provided to the entry point 502 located within the secure element.

The entry point 502 may receive the application identifier and/or the account element kernel identifier from the account element representation 508. The entry point 502 may determine one of the virtual kernel identifiers that corresponds to the application identifier and/or the account element kernel identifier. In the illustrated embodiment, the entry point 502 may determine that a first virtual kernel identifier 510 corresponds to the application identifier and/or the account element kernel identifier.

The entry point 502 may determine a mapping from the determined virtual kernel identifier to the corresponding one of the kernel identifiers 506. In the illustrated embodiment, the entry point 502 may determine that the first virtual kernel identifier 510 maps to the first kernel identifier 512. The first kernel identifier 512 may correspond to a first kernel 514. Based on the mapping, the entry point 502 may determine that the first kernel 514 is to be utilized for performance of the data transfer procedure.

The entry point 502 may further determine a mapping from the determined virtual kernel identifier to a corresponding configuration for the determined kernel. In the illustrated embodiment, the entry point 502 may determine that a first configuration 516 is to be utilized for the data transfer procedure based on the mapping from the first virtual kernel identifier 510 to the first configuration 516. The entry point 502 may cause the first kernel 514 to be configured with the first configuration 516 based on the determination.

The entry point 502 may utilize the first kernel 514 configured with the first configuration 516 in performance of the data transfer. For example, the first kernel 514 with the first configuration 516 may define operations to be performed by secure element as part of the data transfer procedure to be performed. The secure element may perform the operations defined by the first kernel 514 configured with the first configuration 516 with the corresponding data for the data transfer procedure. The secure element may encrypt the results of the operation and provide the encrypted results to the device and/or a provider server (such as the first provider server 126 (FIG. 1) and/or the first provider server 230 (FIG. 2)) to complete the data transfer.

After the secure element has completed the operations for the data transfer procedure, the entry point 502 may flush the memory corresponding to the entry point 502 of any data received from the account element representation 508, and/or any data received from and/or produced by the first kernel 514 as part of the data transfer procedure. Accordingly, the memory corresponding to the entry point 502 may store only data related to the entry point 502 (such as the mappings between the virtual kernel identifiers 504 and the kernel identifiers 506) after completion of the data transfer procedure. The entry point 502 flushing the corresponding memory may prevent any of the other kernels and/or provider servers from obtaining data related to previous data transfers from the memory corresponding to the entry point 502.

Figure 6:
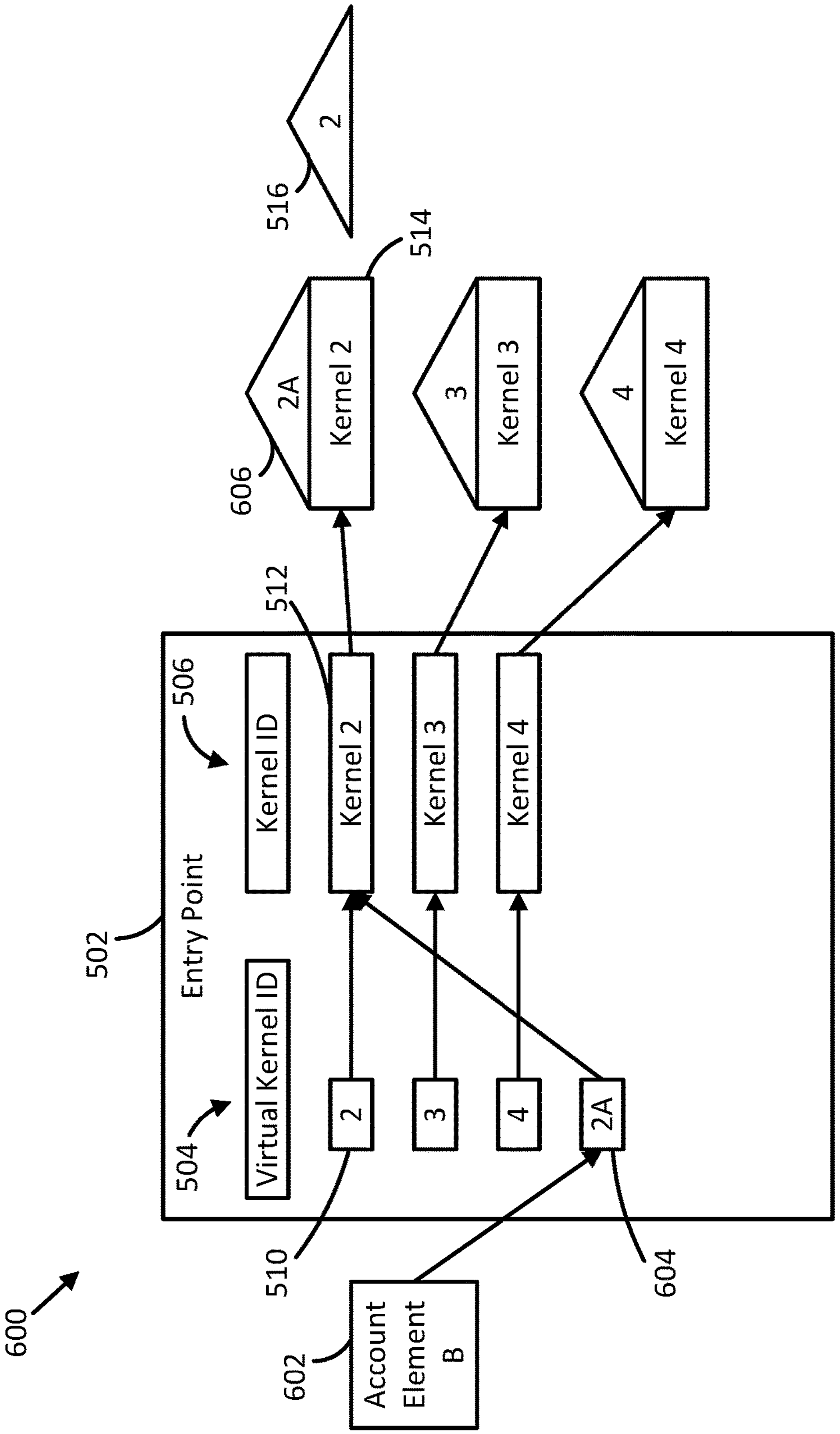
FIG. 6 illustrates another example virtual kernel identifier mapping arrangement in accordance with some embodiments.

FIG. 6 illustrates another example virtual kernel identifier mapping arrangement 600 in accordance with some embodiments. For example, the virtual kernel identifier mapping arrangement 600 illustrates an example arrangement that may be implemented by a secure element, such as the secure element 114 (FIG. 1), the secure element 208 (FIG. 2), and/or the secure element 222 (FIG. 2).

The virtual kernel identifier mapping arrangement 600 may include the entry point 502. The entry point 502 may include the virtual kernel identifiers 504. Further, the entry point 502 may include the kernel identifiers 506. The entry point 502 may maintain the mapping between the virtual kernel identifiers 504 and the kernel identifier 506.

The virtual kernel identifier mapping arrangement 600 may include an account element representation 602. The account element representation 602 may represent an account element (such as the account element 122 (FIG. 1) and/or the second device 210 (FIG. 2)) being located with a proximity of a device (such as the device 102 (FIG. 1) and/or the first device 202 (FIG. 2)). The account element represented by the account element representation 602 may be different than the account element represented by the account element representation 508 (FIG. 5). The account element representation 602 may provide the entry point 502 with an application identifier and/or an account element kernel identifier. The application identifier and/or the account element kernel identifier provided by the account element representation 602 is different than the application identifier and/or the account element kernel identifier provided by the account element representation 508 in the illustrated embodiment.

The entry point 502 may receive the application identifier and/or the account element kernel identifier from the account element representation 602. The entry point 502 may determine one of the virtual kernel identifiers that corresponds to the application identifier and/or the account element kernel identifier. In the illustrated embodiment, the entry point 502 may determine that a second virtual kernel identifier 604 corresponds to the application identifier and/or the account element kernel identifier.

The entry point 502 may determine a mapping from the determined virtual kernel identifier to the corresponding one of the kernel identifiers 506. In the illustrated embodiment, the entry point 502 may determine that the second virtual kernel identifier 604 maps to the first kernel identifier 512. The second virtual kernel identifier 604 may map to the same first kernel identifier 512 as the first virtual kernel identifier 510. The first kernel identifier 512 may correspond to the first kernel 514. Based on the mapping, the entry point 502 may determine that the first kernel 514 is to be utilized for performance of the data transfer procedure.

The entry point 502 may further determine a mapping from the determined virtual kernel identifier to a corresponding configuration for the determined kernel. In the illustrated embodiment, the entry point 502 may determine that a second configuration 606 is to be utilized for the data transfer procedure based on the mapping from the second virtual kernel identifier 604 to the second configuration 606. The entry point 502 may cause the first kernel 514 to be configured with the second configuration 606 based on the determination. For example, the entry point 502 may cause the first kernel 514 to be reconfigured from the first configuration 516 to the second configuration 606. The binary corresponding to the first kernel 514 may remain unchanged throughout the reconfiguration.

The entry point 502 may utilize the first kernel 514 configured with the second configuration 606 in performance of the data transfer. For example, the first kernel 514 configured with the second configuration 606 may define operations to be performed by the secure element as part of the data transfer procedure to be performed. The operations defined by the first kernel 514 with the second configuration 606 may be different than the operations defined by the first kernel 514 configured with the first configuration 516. The secure element may perform the operations defined by the first kernel 514 configured with the second configuration 606 with corresponding data for the data transfer procedure. The secure element may encrypt the results of the operation and provide the encrypted results to the device and/or a provider server (such as the first provider server 126 (FIG. 1) and/or the first provider server 230 (FIG. 2)) to complete the data transfer.

After the secure element has completed the operations for the data transfer procedure, the entry point 502 may flush the memory corresponding to the entry point 502 of any data received from the account element representation 602, and/or any data received from and/or produced by the first kernel 514 as part of the data transfer procedure. Accordingly, the memory corresponding to the entry point 502 may store only data related to the entry point 502 (such as the mappings between the virtual kernel identifiers 504 and the kernel identifiers 506) after completion of the data transfer procedure. The entry point 502 flushing the corresponding memory may prevent any of the other kernels and/or provider servers from obtaining data related to previous data transfers from the memory corresponding to the entry point 502.

Figure 7:
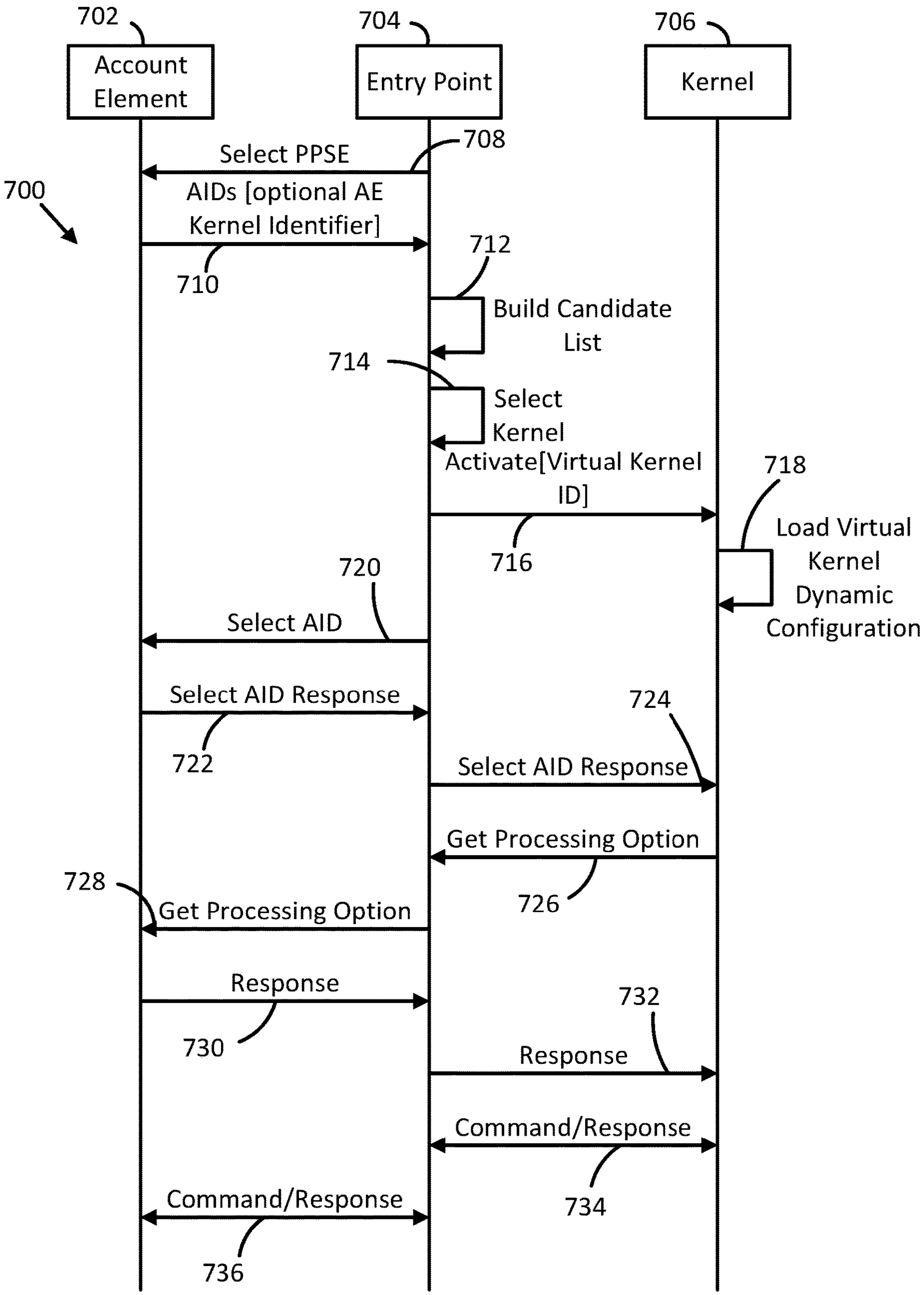
FIG. 7 illustrates a signaling diagram for an example data transfer procedure in accordance with some embodiments.

FIG. 7 illustrates a signaling diagram for an example data transfer procedure 700 in accordance with some embodiments. In particular, the signaling diagram of FIG. 7 illustrates signals that may be exchanged between an account element 702, an entry point 704, and a kernel 706. The account element 702 may include one or more of the features of the account element 122 (FIG. 1), the second device 210 (FIG. 2), the account element representation 508 (FIG. 5) and/or the account element representation 602 (FIG. 6). The entry point 704 may include one or more of the features of the entry point 304 (FIG. 3), the entry point 402 (FIG. 4), and/or the entry point 502 (FIG. 5). The kernel 706 may include one or more of the features of the first kernel 308 (FIG. 3), the second kernel 310 (FIG. 3), the third kernel 312 (FIG. 3), the kernels 408 (FIG. 4), and/or the first kernel 514 (FIG. 5).

The data transfer procedure 700 may initiate with the entry point 704 transmitting a select proximity payment system environment (PPSE) message 708. The select PPSE message 708 may request that the account element 702 provide one or more application identifiers and/or an account element kernel identifier. In instances where the account element 702 includes a passive element for providing the one or more application identifiers and/or the account element kernel identifier (such as the integrated circuit device 124 (FIG. 1)), the PPSE message 708 may provide power for the passive element to provide the one or more application identifiers and/or the account element kernel identifier.

The account element 702 may receive the PPSE message 708 from the entry point 704. The account element 702 may transmit one or more application identifiers and/or an account element kernel identifier in a message 710 to the entry point 704. The application identifiers and/or the account element kernel identifier may indicate an application and/or a kernel to perform the data transfer procedure.

The entry point 704 may receive the one or more application identifiers and/or the account element kernel identifier in the message 710 from the account element 702. The entry point 704 may build a candidate list in 712 based on the received one or more application identifiers and/or the account element kernel identifier. The candidate list may include a list of applications that can be utilized for performing the data transfer.

The entry point 704 may further select a kernel in 714. In particular, the entry point 704 may determine a virtual kernel identifier (such as the virtual kernel identifiers 404 (FIG. 4) and/or the virtual kernel identifiers 504 (FIG. 5)) based on the application identifiers and/or the account element kernel identifier. The entry point 704 may determine a kernel identifier (such as the kernel identifiers 406 (FIG. 4) and/or the kernel identifiers 506 (FIG. 5)) to which the determined virtual kernel identifier is mapped based on a mapping maintained by the entry point 704. The entry point 704 may select the kernel (such as the kernels 408 (FIG. 4) and/or the first kernel 514 (FIG. 5)) corresponding to the determined kernel identifier to be utilized for the data transfer. In the illustrated embodiment, the entry point 704 may select the kernel 706 is for performance of the data transfer.

The entry point 704 may transmit an activation message 716 to the kernel 706 that was selected in 714. The activation message 716 may indicate a configuration (such as the first configuration 430 (FIG. 4), the second configuration 432 (FIG. 4), the third configuration 434 (FIG. 4), the fourth configuration 436 (FIG. 4), the first configuration 516 (FIG. 5), and/or the second configuration 606 (FIG. 6)) for the kernel. In some embodiments, the indication of the configuration may comprise the determined virtual kernel identifier.

The kernel 706 may receive the activation message 716 from the entry point 704. The kernel 706 may determine the configuration to be implemented based on the activation message. The kernel 706 may load the determined configuration in 718.

The entry point 704 may transmit a select application identifier message 720 to the account element 702. The select application identifier message 720 may indicate an application selected by the entry point 704 to be utilized for the data transfer.

The account element 702 may transmit a select application identifier response message 722 to the entry point 704. The select application identifier response message 722 may indicate whether the selected application is acceptable.

The entry point 704 may transmit a select application identifier response message 724 to the kernel 706. The select application identifier response message 724 may indicate the selected application that was accepted for the data transfer.

The kernel 706 may transmit a get processing option message 726 to the entry point 704. The get processing option message 726 may request an indication of a processing option to be utilized for performance of the data transfer. For example, the get processing option message 726 may request a processing option that is supported by the account element 702.

The entry point 704 may receive the get processing option message 726 from the kernel 706. The entry point 704 may transmit a get processing option message 728 to the account element 702. The get processing option message 728 may include a copy of the get processing option message 726 or include one or more features of the get processing option message 726.

The account element 702 may receive the get processing option message 728 from the entry point 704. The account element 702 may transmit a response message 730 to the entry point 704. The response message 730 may indicate a processing option that is supported by the account element 702.

The entry point 704 may receive the response message 730 from the account element 702. The entry point 704 may transmit a response message 732 to the kernel 706. The response message 732 may include a copy of the response message 730 or include one or more features of the response message 730.

The entry point and the kernel 706 may further exchange one or more command and response messages 734 during performance of the data transfer. Additionally, the account element 702 and the entry point 704 may exchange one or more command and response messages 736 during performance of the data transfer.

Figure 8:
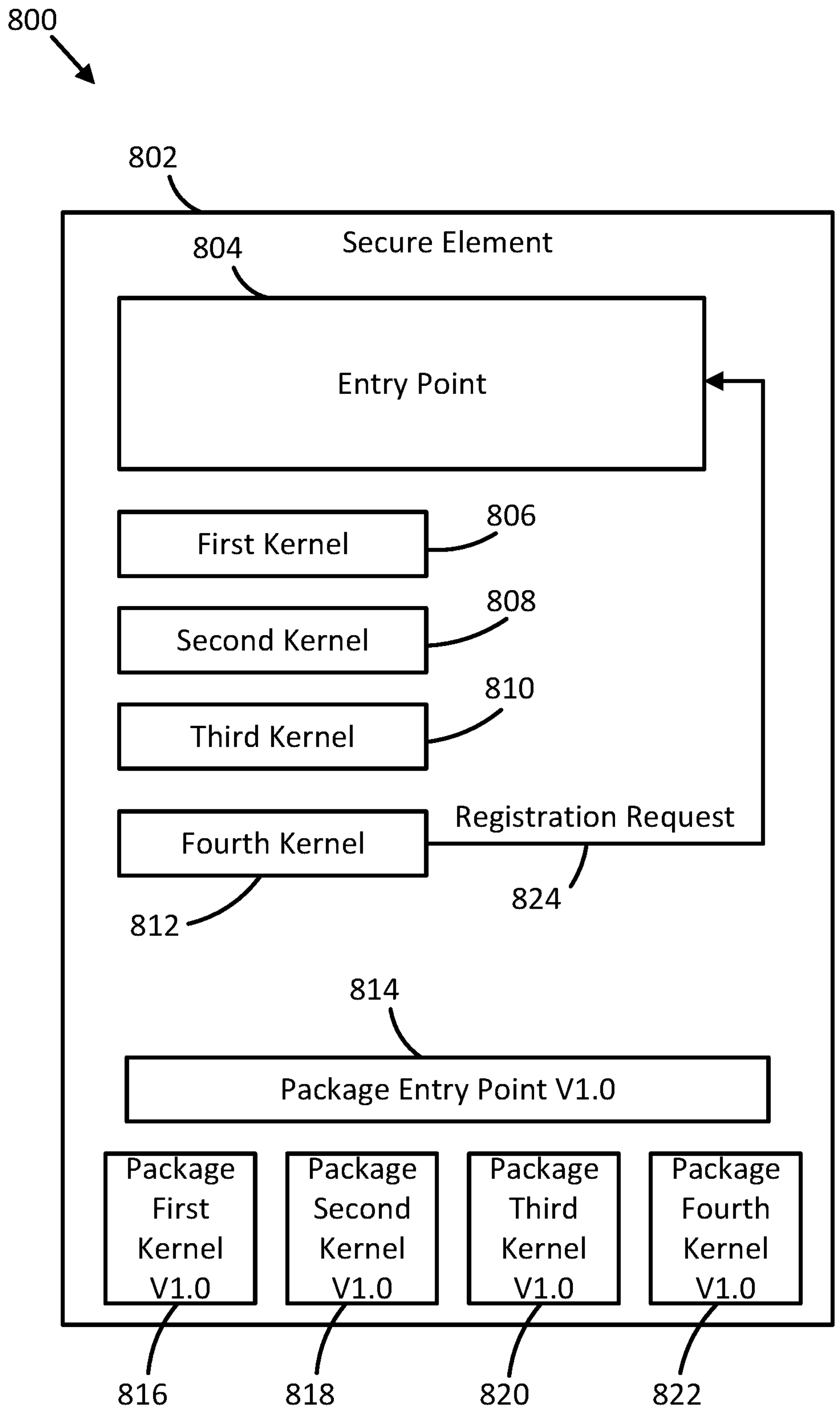
FIG. 8 illustrates an example kernel registration operation representation in accordance with some embodiments.

FIG. 8 illustrates an example kernel registration operation representation 800 in accordance with some embodiments. The kernel registration operation representation 800 illustrates an example of a kernel registering with an entry point within a secure element.

The kernel registration operation representation 800 may include a secure element 802. The secure element 802 may include one or more of the features of the secure element 114 (FIG. 1), the secure element 208 (FIG. 2), the secure element 222 (FIG. 2), and/or the secure element 302 (FIG. 3). The secure element 802 may be included in a device, such as the device 102 (FIG. 1), the first device 202 (FIG. 2), and/or the second device 210 (FIG. 2).

The secure element 802 may include an entry point 804. The entry point 804 may include one or more of the features of the entry point 304 (FIG. 3), the entry point 402 (FIG. 4), the entry point 502 (FIG. 5), and/or the entry point 704 (FIG. 7).

The secure element 802 may further include one or more kernels. For example, the secure element 802 includes a first kernel 806, a second kernel 808, a third kernel 810, and a fourth kernel 812 in the illustrated embodiment. The kernels of the secure element 802 may include one or more of the features of the first kernel 308 (FIG. 3), the second kernel 310 (FIG. 3), the third kernel 312 (FIG. 3), the kernels 408 (FIG. 4), the first kernel 514 (FIG. 5), and/or the kernel 706 (FIG. 7).

Each of the entry point 804 and the kernels may have corresponding software packages. In particular, the entry point 804 has a corresponding entry point software package 814 in the illustrated embodiment. The entry point software package 814 may include one or more of the features of the entry point software package 306 (FIG. 3). The first kernel 806 has a first kernel software package 816, the second kernel 808 has a second kernel software package 818, the third kernel 810 has a third kernel software package 820, and the fourth kernel 812 has a fourth kernel software package 822. The first kernel software package 816, the second kernel software package 818, the third kernel software package 820, and the fourth kernel software package 822 may include one or more of the features of the first kernel software package 314 (FIG. 3), the second kernel software package 316 (FIG. 3), and/or the third kernel software package 318 (FIG. 3).

The first kernel 806, the second kernel 808, and the third kernel 810 may have been previously registered with the entry point 804 in the illustrated embodiment. The fourth kernel 812 may be registering with the entry point 804 in the illustrated embodiment. The fourth kernel 812 may register based on the fourth kernel 812 being installed on the secure element 802 and/or the fourth kernel 812 being updated (such as the fourth kernel software package 822 being updated).

The fourth kernel 812 may transmit a registration request 824 to the entry point 804. The registration request 824 may request that the fourth kernel 812 be registered with the entry point 804. The registration request 824 may include data utilized for registering the fourth kernel 812 with the entry point 804. For example, the registration request 824 may include a kernel identifier corresponding to the fourth kernel 812.

The entry point 804 may receive the registration request 824 from the fourth kernel 812. The entry point 804 may register the fourth kernel 812. The registration of the fourth kernel 812 may build a fourth binary for the fourth kernel 812 based on the registration request 824. The entry point 804 may store the kernel identifier corresponding to the fourth kernel 812. Further, the entry point 804 may generate a new virtual kernel identifier (e.g., a virtual kernel identifier not currently assigned to another kernel) for the fourth kernel 812. The entry point 804 may generate and store a mapping from the new virtual kernel identifier to the kernel identifier corresponding to the fourth kernel 812. The entry point 804 may further generate and store one or more mappings from one or more account element kernel identifiers corresponding to the fourth kernel 812 to the new virtual kernel identifier. Accordingly, the entry point 804 may determine when that the one or more account element kernel identifiers correspond to the fourth kernel 812 based on the mappings.

Each of the kernels may have corresponding binaries. For example, the first kernel 806 may have a first corresponding binary, the second kernel 808 may have a second 20) corresponding binary, the third kernel 810 may have a third corresponding binary, and the fourth kernel 812 may have the fourth corresponding binary. Further, the entry point 804 may have a corresponding entry point binary. The binaries of the first kernel 806, the second kernel 808, the third kernel 810, and the entry point 804 may remain unaffected by the registration of the fourth kernel 812. The use of virtual kernel identifiers by the entry point 804 may provide for the registration of kernels without affecting the binaries of the other kernels and the entry point 804. In contrast, prior approaches have kernels monolithically bound to entry points such that a change to one of the kernels affects the binaries of the other kernels and the entry point.

In some embodiments, the secure element 802, or portions thereof, may be certified by a certification entity, such as the EMVCo. As part of the certification process, the certification entity may store core signatures corresponding to the kernels. The core signatures may be generated based on the binaries of the kernels and the entry point. As the core signatures change, the certification entity may require the portions of the secure element related to the changed core signatures to be recertified. In the instances where registering of a kernel does not affect binaries of other kernels and the binary of the entry point 804, the core signatures related to the other kernels may remain the same and only the newly registered kernel may require certification. In contrast, in legacy approaches where registering of a kernel affects binaries of other kernels and/or the binary of the entry point 804, the core signatures related to the other kernels may change and all the kernels may require certification. Having a single kernel needing certification rather than having to certify multiple kernels may be cheaper and/or faster.

Figure 9:
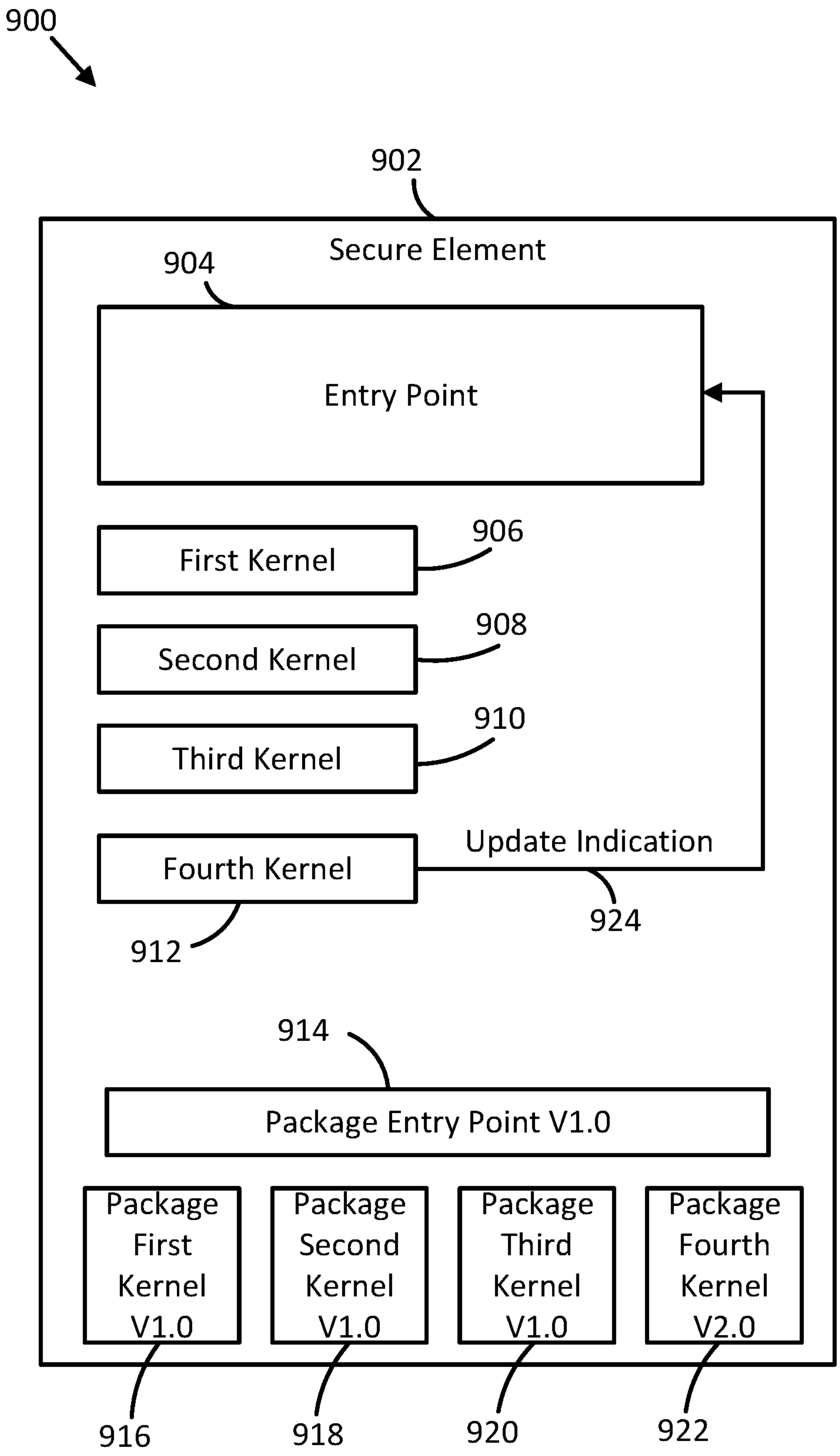
FIG. 9 illustrates an example kernel update operation representation in accordance with some embodiments.

FIG. 9 illustrates an example kernel update operation representation 900 in accordance with some embodiments. The kernel update operation representation 900 illustrates an example of a kernel performing an update with an entry point within a secure element.

The kernel update operation representation 900 may include a secure element 902. The secure element 902 may include one or more of the features of the secure element 114 (FIG. 1), the secure element 208 (FIG. 2), the secure element 222 (FIG. 2), the secure element 302 (FIG. 3), and/or the secure element 802 (FIG. 8). The secure element 902 may be included in a device, such as the device 102 (FIG. 1), the first device 202 (FIG. 2), and/or the second device 210 (FIG. 2).

The secure element 902 may include an entry point 904. The entry point 904 may include one or more of the features of the entry point 304 (FIG. 3), the entry point 402 (FIG. 4), the entry point 502 (FIG. 5), the entry point 704 (FIG. 7), and/or the entry point 804 (FIG. 8).

The secure element 902 may further include one or more kernels. For example, the secure element 902 includes a first kernel 906, a second kernel 908, a third kernel 910, and a fourth kernel 912 in the illustrated embodiment. The kernels of the secure element 902 may include one or more of the features of the first kernel 308 (FIG. 3), the second kernel 310 (FIG. 3), the third kernel 312 (FIG. 3), the kernels 408 (FIG. 4), the first kernel 514 (FIG. 5), the kernel 706 (FIG. 7), the first kernel 806 (FIG. 8), the second kernel 808 (FIG. 8), the third kernel 810 (FIG. 8), and/or the fourth kernel 812 (FIG. 8).

Each of the entry point 904 and the kernels may have corresponding software packages. In particular, the entry point 904 has a corresponding entry point software package 914 in the illustrated embodiment. The entry point software package 914 may include one or more of the features of the entry point software package 306 (FIG. 3) and/or the entry point software package 814 (FIG. 8). The first kernel 906 has a first kernel software package 916, the second kernel 908 has a second kernel software package 918, the third kernel 910 has a third kernel software package 920, and the fourth kernel 912 has a fourth kernel software package 922. The first kernel software package 916, the second kernel software package 918, the third kernel software package 920, and fourth kernel software package 922 may include one or more of the features of the first kernel software package 314 (FIG. 3), the second kernel software package 316 (FIG. 3), the third kernel software package 318 (FIG. 3), the first kernel software package 816 (FIG. 8), the second kernel software package 818 (FIG. 8), the third kernel software package 820 (FIG. 8), and/or the fourth kernel software package 822 (FIG. 8).

The first kernel 906, the second kernel 908, the third kernel 910, and the fourth kernel 912 may have previously registered with the entry point 904. The fourth kernel 912 may be updated in the illustrated embodiment. For example, the fourth kernel software package 922 corresponding to the fourth kernel 912 may be updated, as indicated by the fourth kernel software package 922 being shown as version 2.0.

The fourth kernel 912 may transmit an update indication 924 to the entry point 904. The update indication 924 may indicate that the fourth kernel 912 has been updated. The entry point 904 may rebuild a fourth binary for the fourth kernel 912. The fourth binary produced by the rebuild may be different than the fourth binary prior to the rebuild due to the changes to the fourth kernel 912.

Each of the kernels may have corresponding binaries. For example, the first kernel 906 may have a first corresponding binary, the second kernel 908 may have a second corresponding binary, the third kernel 910 may have a third corresponding binary, and the fourth kernel 912 may have the fourth corresponding binary. Further, the entry point 904 may have a corresponding entry point binary. The binaries of the first kernel 906, the second kernel 908, the third kernel 910, and the entry point 904 may remain unaffected by the update of the fourth kernel 912. The use of virtual kernel identifiers by the entry point 904 may provide for the update of kernels without affecting the binaries of the other kernels and the entry point 904. In contrast, prior approaches have kernels monolithically bound to entry points such that a change to one of the kernels affects the binaries of the other kernels and the entry point.

In some embodiments, the secure element 902 (or portions thereof) may be certified by a certification entity, such as the EMVCo. As part of the certification process, the certification entity may store core signatures corresponding to the kernels. The core signatures may be generated based on the binaries of the kernels and the entry point. As the core signatures change, the certification entity may require the portions of the secure element related to the changed core signatures to be recertified. In the instances where updating of a kernel does not affect binaries of other kernels and the binary of the entry point 904, the core signatures related to the other kernels may remain the same and only the updated kernel may require certification. In contrast, in legacy approaches where updating of a kernel affects binaries of other kernels and/or the binary of the entry point 904, the core signatures related to the other kernels may change and all the kernels may require certification. Having a single kernel needing certification rather than having to certify multiple kernels may be cheaper and/or faster.

Figure 10:
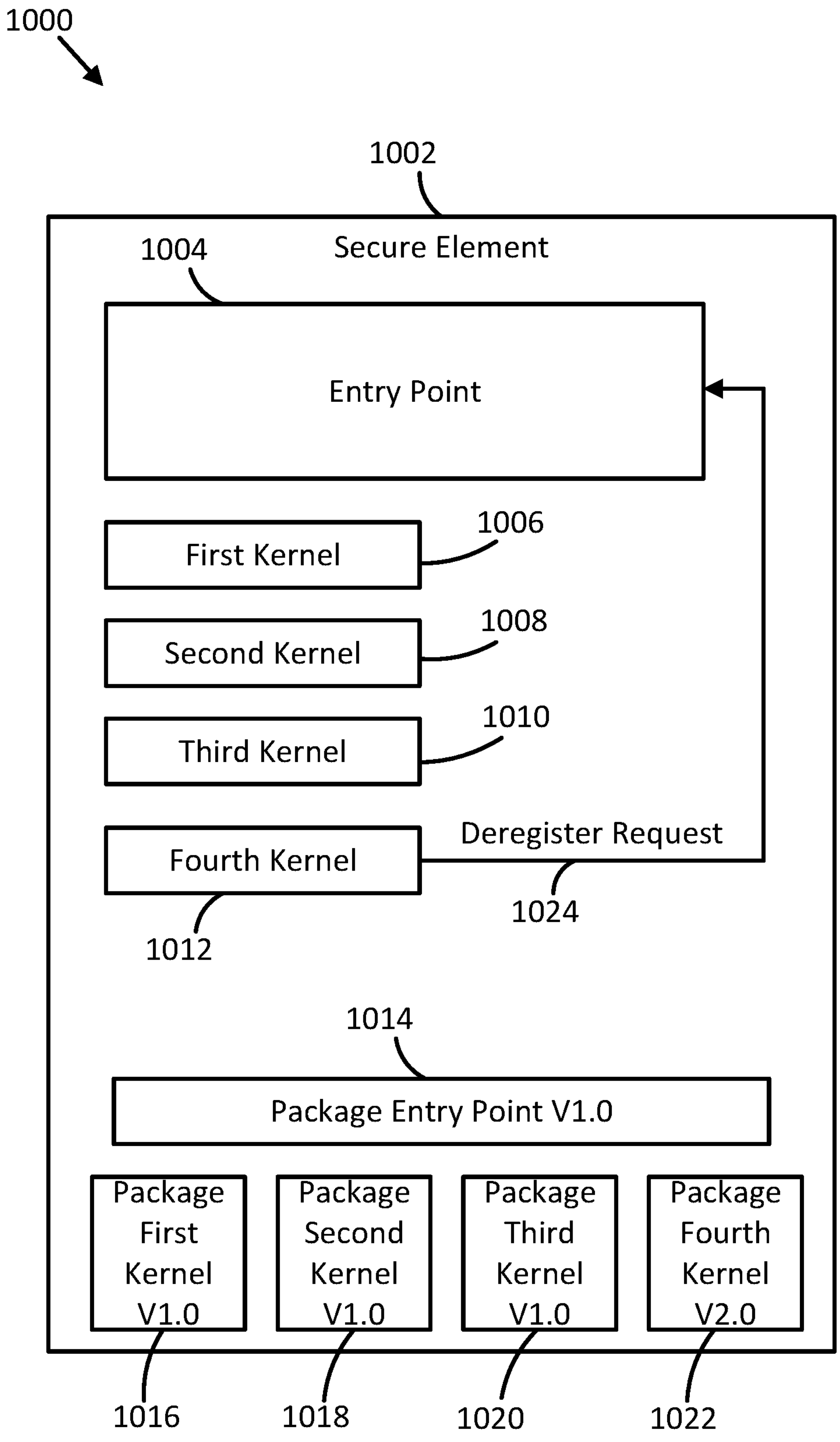
FIG. 10 illustrates an example kernel deregister operation representation in accordance with some embodiments.

FIG. 10 illustrates an example kernel deregister operation representation 1000 in accordance with some embodiments. The kernel deregister operation representation 1000 illustrate an example of a kernel deregistering with an entry point within a secure element.

The kernel deregister operation representation 1000 may include a secure element 1002. The secure element 1002 may include one or more of the features of the secure element 114 (FIG. 1), the secure element 208 (FIG. 2), the secure element 222 (FIG. 2), the secure element 302 (FIG. 3), the secure element 802 (FIG. 8), and/or the secure element 902 (FIG. 9). The secure element 802 may be included in a device, such as the device 102 (FIG. 1), the first device 202 (FIG. 2), and/or the second device 210 (FIG. 2).

The secure element 1002 may include an entry point 1004. The entry point 1004 may include one or more of the features of the entry point 304 (FIG. 3), the entry point 402 (FIG. 4), the entry point 502 (FIG. 5), the entry point 704 (FIG. 7), the entry point 804 (FIG. 8), and/or the entry point 904 (FIG. 9).

The secure element 1002 may further include one or more kernels. For example, the secure element 1002 includes a first kernel 1006, a second kernel 1008, a third kernel 1010, and a fourth kernel 1012 in the illustrated embodiment. The kernels of the secure element 1002 may include one or more of the features of the first kernel 308 (FIG. 3), the second kernel 310 (FIG. 3), the third kernel 312 (FIG. 3), the kernels 408 (FIG. 4), the first kernel 514 (FIG. 5), the kernel 706 (FIG. 7), the first kernel 806 (FIG. 8), the second kernel 808 (FIG. 8), the third kernel 810 (FIG. 8), the fourth kernel 812 (FIG. 8), the first kernel 906 (FIG. 9), the second kernel 908 (FIG. 9), the third kernel 910 (FIG. 9), and/or the fourth kernel 912 (FIG. 9).

Each of the entry point 1004 and the kernels may have corresponding software packages. In particular, the entry point 1004 has a corresponding entry point software package 1014 in the illustrated embodiment. The entry point software package 1014 may include one or more of the features of the entry point software package 306 (FIG. 3), the entry point software package 814 (FIG. 8), and/or the entry point software package 914 (FIG. 9). The first kernel 1006 has a first kernel software package 1016, the second kernel 1008 has a second kernel software package 1018, the third kernel 1010 has a third kernel software package 1020, and the fourth kernel 1012 has a fourth kernel software package 1022. The first kernel software package 1016, the second kernel software package 1018, the third kernel software package 1020, and fourth kernel software package 1022 may include one or more of the features of the first kernel software package 314 (FIG. 3), the second kernel software package 316 (FIG. 3), the third kernel software package 318 (FIG. 3), the first kernel software package 816 (FIG. 8), the second kernel software package 818 (FIG. 8), the third kernel software package 820 (FIG. 8), the fourth kernel software package 822 (FIG. 8), the first kernel software package 916 (FIG. 9), the second kernel software package 918 (FIG. 9), the third kernel software package 920 (FIG. 9), and/or the fourth kernel software package 922 (FIG. 9).

The first kernel 1006, the second kernel 1008, the third kernel 1010, and the fourth kernel 1012 may have previously registered with the entry point 1004. The fourth kernel 1012 may deregister with the entry point 1004 in the illustrated embodiment. The fourth kernel 1012 may deregister with the entry point 1004 based on an application being uninstalled from the device and/or the secure element 1002. The fourth kernel 1012 may transmit a deregister request 1024 to the entry point 1004. The deregister request 1024 may indicate that the fourth kernel 1012 is requesting to be deregistered.

The entry point 1004 may receive the deregister request 1024 from the fourth kernel 1012. The entry point 1004 may determine that the fourth kernel 1012 is to be deregistered. The entry point 1004 may purge information related to the fourth kernel 1012 from the entry point 1004. For example, the entry point 1004 may delete the kernel identifier corresponding to the fourth kernel 1012, the mappings related to fourth kernel 1012, and/or other data related to the fourth kernel 1012 from the memory corresponding to the entry point 1004. The entry point 1004 may not utilize the fourth kernel 1012 for performance of data transfers after completion of the deregistering operation.

Each of the kernels may have corresponding binaries. For example, the first kernel 1006 may have a first corresponding binary, the second kernel 1008 may have a second corresponding binary, the third kernel 1010 may have a third corresponding binary, and the fourth kernel 1012 may have the fourth corresponding binary. Further, the entry point 1004 may have a corresponding entry point binary. The binaries of the first kernel 1006, the second kernel 1008, the third kernel 1010, and the entry point 1004 may remain unaffected by the deregistration of the fourth kernel 1012. The use of virtual kernel identifiers by the entry point 1004 may provide for the deregistration of kernels without affecting the binaries of the other kernels and the entry point 1004. In contrast, prior approaches have kernels monolithically bound to entry points such that a change to one of the kernels affects the binaries of the other kernels and the entry point.

In some embodiments, the secure element 1002 (or portions thereof) may be certified by a certification entity, such as the EMVCo. As part of the certification process, the certification entity may store core signatures corresponding to the kernels. The core signatures may be generated based on the binaries of the kernels and the entry point. As the core signatures change, the certification entity may require the portions of the secure element related to the changed core signatures to be recertified. In the instances where deregistering of a kernel does not affect binaries of other kernels and the binary of the entry point 1004, the core signatures related to the other kernels may remain the same such that the kernels that were not deregistered do not require recertification. In contrast, in legacy approaches where deregistering of a kernel affects binaries of other kernels and/or the binary of the entry point 1004, the core signatures related to the other kernels may change and all the kernels may require certification.

Figure 11:
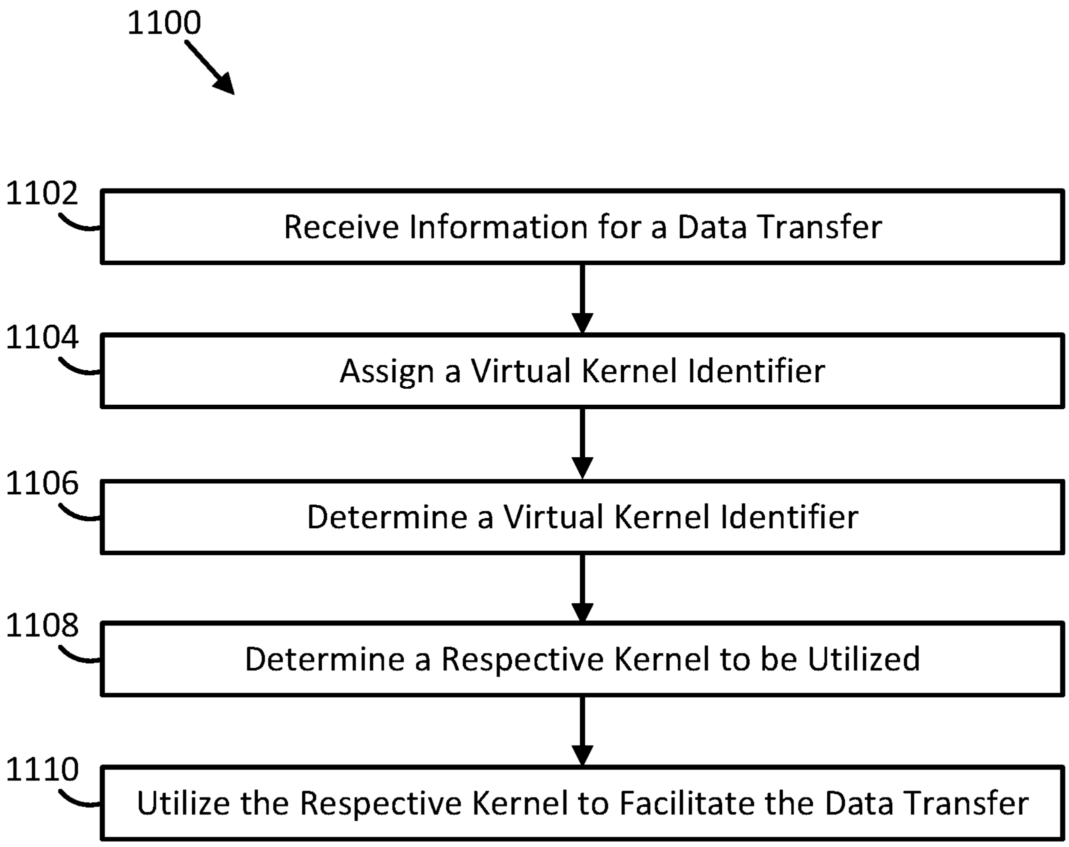
FIG. 11 illustrates an example procedure for a data transfer in accordance with some embodiments.

FIG. 11 illustrates an example procedure 1100 for a data transfer in accordance with some embodiments. The procedure 1100 may be performed by a device, such as the device 102 (FIG. 1), the first device 202 (FIG. 2), and/or the second device 210 (FIG. 2). For example, the procedure 1100 may be performed by a secure element (such as the secure element 114 (FIG. 1), the secure element 208 (FIG. 2), the secure element 222 (FIG. 2), the secure element 302 (FIG. 3), the secure element 802 (FIG. 8), the secure element 902 (FIG. 9), and/or the secure element 1002 (FIG. 10)) of the device in some embodiments.

In 1102, the procedure 1100 may include receiving information for a data transfer. For example, the device may receive information for a data transfer. The information may include an application identifier. In some embodiments, the information may further include an account element identifier.

In 1104, the procedure 1100 may include assigning a virtual kernel identifier. For example, the device may assign a virtual kernel identifier to map the application identifier to a respective kernel stored by the device.

In 1106, the procedure 1100 may include determining the virtual kernel identifier. For example, the device may determine the virtual kernel identifier based at least in part on the application identifier.

In some embodiments, the virtual kernel identifier may be further determined based at least in part on the account element kernel identifier. The virtual kernel identifier may be assigned by the device to map the account element kernel identifier to the respective kernel. In some embodiments, the determination of the virtual kernel identifier may include determining that the account element kernel identifier is mapped to the virtual kernel identifier.

In 1108, the procedure 1100 may include determining a respective kernel to be utilized. For example, the device may determine the respective kernel to be utilized for performance of the data transfer based at least in part on the virtual kernel identifier and the mapping. In some embodiments, the determination of the respective kernel may include determining that the virtual kernel identifier is mapped to a kernel identifier associated with the respective kernel.

In some embodiments, the procedure 1100 may further include determining a configuration for the respective kernel. For example, the device may determine a configuration for the respective kernel based at least in part on the virtual kernel identifier. The device may configure the respective kernel with the configuration. In some embodiments, the configuration may be a first configuration. The respective kernel may be initially configured with a second configuration. The configuration of the respective kernel with the first configuration may include reconfiguring the respective kernel from the second configuration to the first configuration without affecting a core signature associated with the respective kernel. In some embodiments, the device may generate the core signature for the respective kernel based at least in part on a binary of the respective kernel. The core signature for the respective kernel may remain the same through the respective kernel being reconfigured with different configurations.

In some embodiments, the procedure 1100 may further include receiving a registration request for the respective kernel. For example, the device may receive a registration request for the respective kernel. The virtual kernel identifier may be assigned based at least in part on the registration request.

In some embodiments, the virtual kernel identifier may be a first virtual kernel identifier. Further, the application identifier may be a first application identifier. The first configuration for the respective kernel may correspond to the first application identifier. The device may receive a registration request corresponding to a second application identifier. The device may determine that the second application identifier corresponds to the respective kernel with a second configuration. The device may assign a second virtual kernel identifier to the respective kernel with the second configuration. The second virtual kernel identifier may indicate that the respective kernel with the second configuration is to be utilized.

In 1110, the procedure 1100 may include utilizing the respective kernel to facilitate the data transfer. For example, the device may utilize the respective kernel to facilitate the data transfer. In some embodiments, the kernel configured with the determined configuration may be utilized to facilitate the data transfer.

In some embodiments, one or more of the operations of the procedure 1100 may be performed by the secure element within the device. The virtual kernel identifier may be assigned by the secure element. Further, the respective kernel may be stored by the secure element.

While FIG. 11 may arguably imply an order of the operations of the procedure 1100, it should be understood that the operations of the procedure 1100 may be performed in different orders and/or one or more of the operations of the procedure 1100 may be performed concurrently in embodiments. Further, it should be understood that one or more of the operations of the procedure 1100 may be omitted and/or one or more additional operations may be included in the procedure 1100 in other embodiments.

Figure 12:
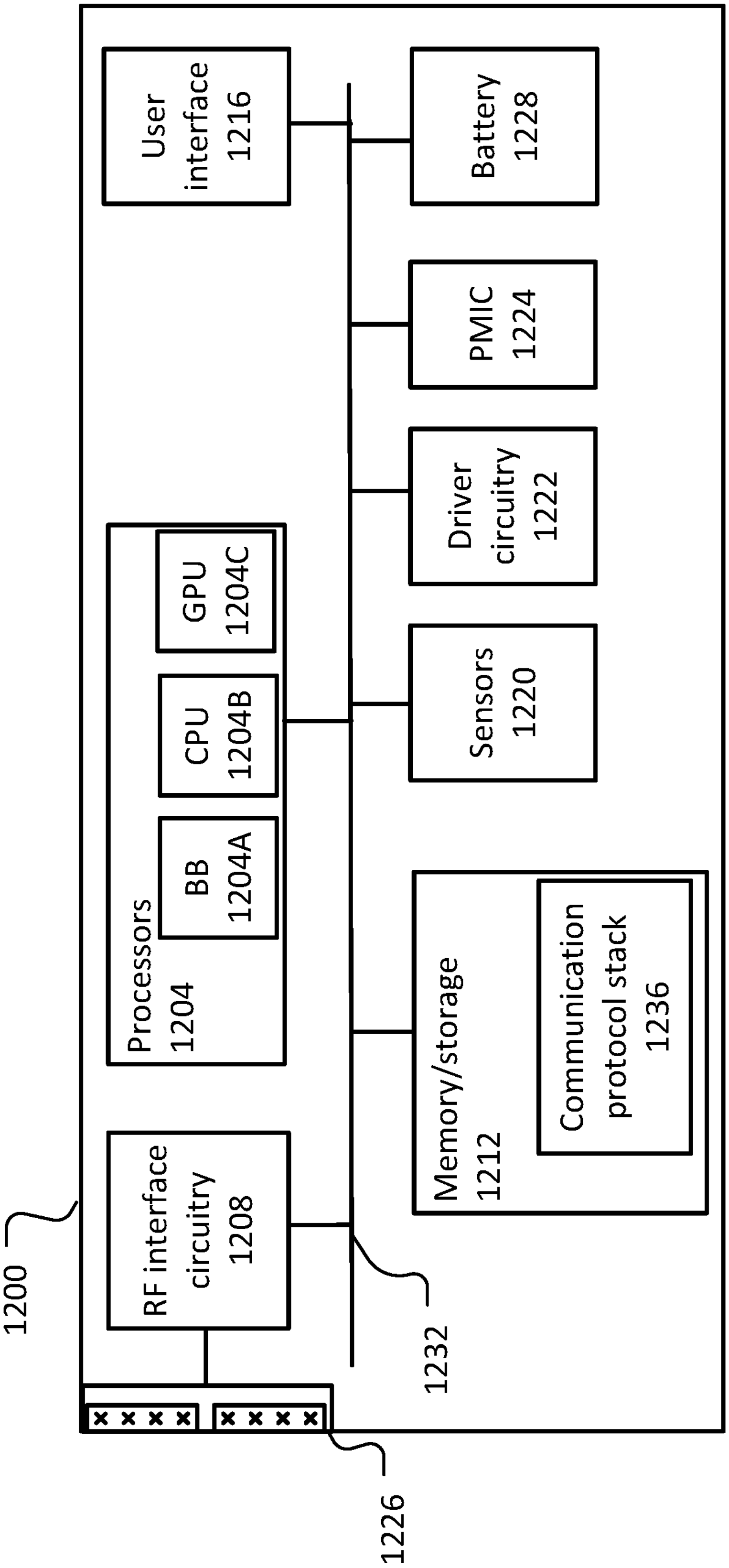
FIG. 12 illustrates an example device in accordance with some embodiments.

FIG. 12 illustrates an example device 1200 in accordance with some embodiments. The device 1200 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the device 1200 may be a RedCap UE or NR-Light UE.

The device 1200 may include processors 1204, RF interface circuitry 1208, memory/storage 1212, user interface 1216, sensors 1220, driver circuitry 1222, power management integrated circuit (PMIC) 1224, antenna structure 1226, and battery 1228. The components of the device 1200 may be implemented as integrated circuits (ICs), portions thereof, discrete electronic devices, or other modules, logic, hardware, software, firmware, or a combination thereof. The block diagram of FIG. 12 is intended to show a high-level view of some of the components of the device 1200. However, some of the components shown may be omitted, additional components may be present, and different arrangement of the components shown may occur in other implementations.

The components of the device 1200 may be coupled with various other components over one or more interconnects 1232, which may represent any type of interface, input/output, bus (local, system, or expansion), transmission line, trace, optical connection, etc. that allows various circuit components (on common or different chips or chipsets) to interact with one another.

The processors 1204 may include processor circuitry such as, for example, baseband processor circuitry (BB) 1204A, central processor unit circuitry (CPU) 1204B, and graphics processor unit circuitry (GPU) 1204C. The processors 1204 may include any type of circuitry or processor circuitry that executes or otherwise operates computer-executable instructions, such as program code, software modules, or functional processes from memory/storage 1212 to cause the device 1200 to perform operations as described herein.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1208.

The baseband processor circuitry 1204A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1212 may include one or more non-transitory, computer-readable media that includes instructions (for example, communication protocol stack 1236) that may be executed by one or more of the processors 1204 to cause the device 1200 to perform various operations described herein. The memory/storage 1212 include any type of volatile or non-volatile memory that may be distributed throughout the device 1200. In some embodiments, some of the memory/storage 1212 may be located on the processors 1204 themselves (for example, L1 and L2 cache), while other memory/storage 1212 is external to the processors 1204 but accessible thereto via a memory interface. The memory/storage 1212 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1208 may include transceiver circuitry and radio frequency front module (RFEM) that allows the device 1200 to communicate with other devices over a radio access network. The RF interface circuitry 1208 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1226 and proceed to filter and amplify (with a low-noise amplifier) the signal. The signal may be provided to a receiver of the transceiver that down-converts the RF signal into a baseband signal that is provided to the baseband processor of the processors 1204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1226.

In various embodiments, the RF interface circuitry 1208 may be configured to transmit/receive signals in a manner compatible with NR access technologies.

The antenna 1226 may include antenna elements to convert electrical signals into radio waves to travel through the air and to convert received radio waves into electrical signals. The antenna elements may be arranged into one or more antenna panels. The antenna 1226 may have antenna panels that are omnidirectional, directional, or a combination thereof to enable beamforming and multiple input, multiple output communications. The antenna 1226 may include microstrip antennas, printed antennas fabricated on the surface of one or more printed circuit boards, patch antennas, phased array antennas, etc. The antenna 1226 may have one or more panels designed for specific frequency bands including bands in FR1 or FR2.

The user interface circuitry 1216 includes various input/output (I/O) devices designed to enable user interaction with the device 1200. The user interface 1216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the device 1200.

The sensors 1220 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers: microelectromechanical systems or nanoelectromechanical systems comprising 3-axis accelerometers, 3-axis gyroscopes, or magnetometers: level sensors: flow sensors: temperature sensors (for example, thermistors): pressure sensors; barometric pressure sensors: gravimeters: altimeters: image capture devices (for example, cameras or lensless apertures): light detection and ranging sensors: proximity sensors (for example, infrared radiation detector and the like): depth sensors: ambient light sensors; ultrasonic transceivers: microphones or other like audio capture devices: etc.

The driver circuitry 1222 may include software and hardware elements that operate to control particular devices that are embedded in the device 1200, attached to the device 1200, or otherwise communicatively coupled with the device 1200. The driver circuitry 1222 may include individual drivers allowing other components to interact with or control various input/output (I/O) devices that may be present within, or connected to, the device 1200. For example, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, audio drivers to control and allow access to one or more audio devices.

The PMIC 1224 may manage power provided to various components of the device 1200. In particular, with respect to the processors 1204, the PMIC 1224 may control power-source selection, voltage scaling, battery charging, or DC-to-DC conversion.

In some embodiments, the PMIC 1224 may control, or otherwise be part of, various power saving mechanisms of the device 1200. For example, if the platform device is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power. If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state: in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1228 may power the device 1200, although in some examples the device 1200 may be mounted deployed in a fixed location, and may have a power supply coupled to an electrical grid. The battery 1228 may be a lithium ion battery, a metal-air battery, such as a zinc-air battery, an aluminum-air battery, a lithium-air battery, and the like. In some implementations, such as in vehicle-based applications, the battery 1228 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a device, network element, etc. as described above in connection with one or more of the preceding figures may be configured to operate in accordance with one or more of the examples set forth below in the example section.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

As described, one aspect of the present technology is the gathering and use of data available from specific and legitimate sources to perform data transfers. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to determine accounts associated with users. Accordingly, use of the personal information data can facilitate data transfers between accounts associated with the users.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA): whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

In some examples, "circuitry" can refer to, be part of, or include hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry." as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry." as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel"

may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

It is well known in the art that an account element may provide a kernel identifier, which is commonly referred to as "a kernel identifier," to the device and the kernel may have a kernel identifier, which is commonly referred to as "a kernel ID," internally defined for the kernel. To avoid confusion, the kernel identifier provided by the account element is referred herein as "an account element kernel identifier," and the kernel identifier internally defined for the kernel is referred herein as "a kernel identifier." It should be understood that the "account element kernel identifier" as used herein may refer to the "kernel identifier" and the "kernel identifier" as used herein may refer to the "kernel ID."

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising." "having." "including." and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or," unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The specific details of particular embodiments may be combined in any suitable manner or varied from those shown and described herein without departing from the spirit and scope of embodiments of the described techniques.

The above description of exemplary embodiments of the described techniques has been presented for the purposes of illustration and description. It is not intended to be exhaustive or to limit the described techniques to the precise form described, and many modifications and variations are possible in light of the teaching above. The embodiments were chosen and described in order to best explain the principles of the described techniques and its practical applications to thereby enable others skilled in the art to best utilize the described techniques in various embodiments and with various modifications as are suited to the particular use contemplated.

All publications, patents, and patent applications cited herein are hereby incorporated by reference in their entirety for all purposes.

EXAMPLES

In the following sections, further exemplary embodiments are provided.

Example 1 may include one or more computer-readable media having instructions that, when executed by one or more processors of a device, configure the one or more processors to receive information for a data transfer, the information including an application identifier, determine a virtual kernel identifier based at least in part on the application identifier, the virtual kernel identifier enabling a mapping of the application identifier to a respective kernel stored by the device, determine the respective kernel to be utilized for performance of the data transfer based at least in part on the virtual kernel identifier and the mapping, and utilize the respective kernel to facilitate the data transfer.

Example 2 may include the one or more computer-readable media of example 1, wherein the information further includes an account element kernel identifier, wherein the virtual kernel identifier is further determined based at least in part on the account element kernel identifier, and wherein the virtual kernel identifier is used by the device to map the account element kernel identifier to the respective kernel.

Example 3 may include the one or more computer-readable media of example 2, wherein the determination of the virtual kernel identifier comprises determining that the account element kernel identifier is mapped to the virtual kernel identifier, and the determination of the respective kernel comprises determining that the virtual kernel identifier is mapped to a kernel identifier associated with the respective kernel.

Example 4 may include the one or more computer-readable media of example 1, wherein the one or more processors are further configured to determine a configuration for the respective kernel based at least in part on the virtual kernel identifier, and configure the respective kernel with the configuration, wherein the respective kernel configured with the configuration is utilized to facilitate the data transfer.

Example 5 may include the one or more computer-readable media of example 4, wherein the configuration is a first configuration, wherein the respective kernel is initially configured with a second configuration, and wherein the configuration of the respective kernel with the first configuration comprises reconfiguring the respective kernel from the second configuration to the first configuration without affecting a core signature associated with the respective kernel.

Example 6 may include the one or more computer-readable media of example 1, wherein the one or more processors are further configured to receive a registration request for the respective kernel, and map the application identifier to the respective kernel via the virtual kernel identifier based at least in part on the registration request.

Example 7 may include the one or more computer-readable media of example 1, wherein the virtual kernel identifier is a first virtual kernel identifier, wherein the application identifier is a first application identifier, wherein a first configuration for the respective kernel corresponds to the first application identifier, and wherein the one or more processors are further configured to receive a registration request corresponding to a second application identifier, determine that second application identifier corresponds to the respective kernel with a second configuration, and map a second virtual kernel identifier to the respective kernel with the second configuration, the second virtual kernel identifier to indicate that the respective kernel with the second configuration is to be utilized.

Example 8 may include the one or more computer-readable media of example 1, wherein the one or more processors are further configured to generate a core signature for the respective kernel based at least in part on a binary of the respective kernel, wherein the core signature for the respective kernel remains the same through the respective kernel being reconfigured with different configurations.

Example 9 may include the one or more computer-readable media of example 1, wherein the one or more processors are one or more processors of a secure element within the device, wherein the virtual kernel identifier is assigned by the secure element, and wherein the respective kernel is stored by the secure element.

Example 10 may include a device, comprising an application processor to execute a terminal application for a data transfer, and a secure element coupled to the application processor, the secure element to receive information for the data transfer, the information including an application identifier, determine a virtual kernel identifier based at least in part on the application identifier, the virtual kernel identifier enabling a mapping of the application identifier to a respective kernel stored by the device, determine the respective kernel to be utilized for performance of the data transfer based at least in part on the virtual kernel identifier and the mapping, and utilize the respective kernel to facilitate the data transfer.

Example 11 may include the device of example 10, wherein the information further includes an account element kernel identifier, wherein the virtual kernel identifier is further determined based at least in part on the account element kernel identifier, and wherein the virtual kernel identifier is used by the secure element to map the account element kernel identifier to the respective kernel.

Example 12 may include the device of example 11, wherein the determination of the virtual kernel identifier comprises determining that the account element kernel identifier is mapped to the virtual kernel identifier, and the determination of the respective kernel comprises determining that the virtual kernel identifier is mapped to a kernel identifier associated with the respective kernel.

Example 13 may include the device of example 10, wherein the secure element is further to determine a configuration for the respective kernel based at least in part on the virtual kernel identifier, and configure the respective kernel with the configuration, wherein the respective kernel configured with the configuration is utilized to facilitate the data transfer.

Example 14 may include the device of example 13, wherein the configuration is a first configuration, wherein the respective kernel is initially configured with a second configuration, and wherein the configuration of the respective kernel with the first configuration comprises reconfiguring the respective kernel from the second configuration to the first configuration without affecting a core signature associated with the respective kernel.

Example 15 may include the device of example 10, wherein the secure element is further to receive a registration request for the respective kernel, and map the application identifier to the respective kernel via the virtual kernel identifier based at least in part on the registration request.

Example 16 may include the device of example 10, wherein the virtual kernel identifier is a first virtual kernel identifier, wherein the application identifier is a first application identifier, wherein a first configuration for the respective kernel corresponds to the first application identifier, and wherein the secure element is further to receive a registration request corresponding to a second application identifier, determine that second application identifier corresponds to the respective kernel with a second configuration, and map a second virtual kernel identifier to the respective kernel with the second configuration, the second virtual kernel identifier to indicate that the respective kernel with the second configuration is to be utilized.

Example 17 may include a method of performing a data transfer, comprising receiving, by a device, information for the data transfer, the information including an application identifier, determining, by the device, a virtual kernel identifier based at least in part on the application identifier, the virtual kernel identifier enabling a mapping of the application identifier to a respective kernel stored by the device, determining, by the device, the respective kernel to be utilized for performance of the data transfer based at least in part on the virtual kernel identifier and the mapping, and utilizing, by the device, the respective kernel to facilitate the data transfer.

Example 18 may include the method of example 17, wherein the information further includes an account element kernel identifier, wherein the virtual kernel identifier is further determined based at least in part on the account element kernel identifier, and wherein the virtual kernel identifier is used by the device to map the account element kernel identifier to the respective kernel.

Example 19 may include the method of example 17, further comprising receiving, by the device, a registration request for the respective kernel, and mapping, by the device, the application identifier to the respective kernel via the virtual kernel identifier based at least in part on the registration request.

Example 20 may include the method of example 17, wherein the virtual kernel identifier is a first virtual kernel identifier, wherein the application identifier is a first application identifier, wherein a first configuration for the respective kernel corresponds to the first application identifier, and wherein the method further comprises receiving, by the device, a registration request corresponding to a second application identifier, determining, by the device, that second application identifier corresponds to the respective kernel with a second configuration, and mapping, by the device, a second virtual kernel identifier to the respective kernel with the second configuration, the second virtual kernel identifier to indicate that the respective kernel with the second configuration is to be utilized.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors of a device, configure the one or more processors to:

receive information for a data transfer, the information including an application identifier;

determine a virtual kernel identifier based at least in part on the application identifier, the virtual kernel identifier enabling a mapping of the application identifier to a respective kernel stored by the device;

determine the respective kernel to be utilized for performance of the data transfer based at least in part on the virtual kernel identifier and the mapping;

determine a configuration for the respective kernel based at least in part on the virtual kernel identifier;

configure the respective kernel with the configuration; and utilize the respective kernel, configured with the configuration, to facilitate the data transfer.

2. The one or more non-transitory computer-readable media of claim 1, wherein the information further includes an account element kernel identifier, wherein the virtual kernel identifier is further determined based at least in part on the account element kernel identifier, and wherein the virtual kernel identifier is used by the device to map the account element kernel identifier to the respective kernel.

3. The one or more non-transitory computer-readable media of claim 2, wherein:

the determination of the virtual kernel identifier comprises determining that the account element kernel identifier is mapped to the virtual kernel identifier; and the determination of the respective kernel comprises determining that the virtual kernel identifier is mapped to a kernel identifier associated with the respective kernel.

4. The one or more non-transitory computer-readable media of claim 1, wherein the configuration is a first configuration, wherein the respective kernel is initially configured with a second configuration, and wherein the configuration of the respective kernel with the first configuration comprises reconfiguring the respective kernel from the second configuration to the first configuration without affecting a core signature associated with the respective kernel.

5. The one or more non-transitory computer-readable media of claim 1, wherein the one or more processors are further configured to:

receive a registration request for the respective kernel; and map the application identifier to the respective kernel via the virtual kernel identifier based at least in part on the registration request.

6. The one or more non-transitory computer-readable media of claim 1, wherein the virtual kernel identifier is a first virtual kernel identifier, wherein the application identifier is a first application identifier, wherein the configuration is a first configuration, wherein the first configuration for the respective kernel corresponds to the first application identifier, and wherein the one or more processors are further configured to:

receive a registration request corresponding to a second application identifier;

determine that second application identifier corresponds to the respective kernel with a second configuration; and map a second virtual kernel identifier to the respective kernel with the second configuration, the second virtual kernel identifier to indicate that the respective kernel with the second configuration is to be utilized.

7. The one or more non-transitory computer-readable media of claim 1, wherein the one or more processors are further configured to:

generate a core signature for the respective kernel based at least in part on a binary of the respective kernel, wherein the core signature for the respective kernel remains the same through the respective kernel being reconfigured with different configurations.

8. The one or more non-transitory computer-readable media of claim 1, wherein the one or more processors are one or more processors of a secure element within the device, wherein the virtual kernel identifier is assigned by the secure element, and wherein the respective kernel is stored by the secure element.

9. A device, comprising:

an application processor to execute a terminal application for a data transfer; and a secure element coupled to the application processor, the secure element to:

receive information for the data transfer, the information including an application identifier;

determine a virtual kernel identifier based at least in part on the application identifier, the virtual kernel identifier enabling a mapping of the application identifier to a respective kernel stored by the device;

determine the respective kernel to be utilized for performance of the data transfer based at least in part on the virtual kernel identifier and the mapping;

determine a configuration for the respective kernel based at least in part on the virtual kernel identifier;

configure the respective kernel with the configuration; and utilize the respective kernel, configured with the configuration, to facilitate the data transfer.

10. The device of claim 9, wherein the information further includes an account element kernel identifier, wherein the virtual kernel identifier is further determined based at least in part on the account element kernel identifier, and wherein the virtual kernel identifier is used by the secure element to map the account element kernel identifier to the respective kernel.

11. The device of claim 10, wherein:

the determination of the virtual kernel identifier comprises determining that the account element kernel identifier is mapped to the virtual kernel identifier; and the determination of the respective kernel comprises determining that the virtual kernel identifier is mapped to a kernel identifier associated with the respective kernel.

12. The device of claim 9, wherein the configuration is a first configuration, wherein the respective kernel is initially configured with a second configuration, and wherein the configuration of the respective kernel with the first configuration comprises reconfiguring the respective kernel from the second configuration to the first configuration without affecting a core signature associated with the respective kernel.

13. The device of claim 9, wherein the secure element is further to:

receive a registration request for the respective kernel; and map the application identifier to the respective kernel via the virtual kernel identifier based at least in part on the registration request.

14. The device of claim 9, wherein the virtual kernel identifier is a first virtual kernel identifier, wherein the application identifier is a first application identifier, wherein the configuration is a first configuration, wherein the first configuration for the respective kernel corresponds to the first application identifier, and wherein the secure element is further to:

receive a registration request corresponding to a second application identifier;

determine that second application identifier corresponds to the respective kernel with a second configuration; and map a second virtual kernel identifier to the respective kernel with the second configuration, the second virtual kernel identifier to indicate that the respective kernel with the second configuration is to be utilized.

15. A method of performing a data transfer, comprising:

executing, by one or more processors, a terminal application for the data transfer;

receiving, by secure element coupled to the one or more processors, information for the data transfer, the information including an application identifier;

determining, by the secure element, a virtual kernel identifier based at least in part on the application identifier, the virtual kernel identifier enabling a mapping of the application identifier to a respective kernel stored by a device;

determining, by the secure element, the respective kernel to be utilized for performance of the data transfer based at least in part on the virtual kernel identifier and the mapping;

determining, by the secure element, a configuration for the respective kernel based at least in part on the virtual kernel identifier;

configuring, by the secure element, the respective kernel with the configuration; and utilizing, by the secure element, the respective kernel, configured with the configuration, to facilitate the data transfer.

16. The method of claim 15, wherein the information further includes an account element kernel identifier, wherein the virtual kernel identifier is further determined based at least in part on the account element kernel identifier, and wherein the virtual kernel identifier is used by the device to map the account element kernel identifier to the respective kernel.

17. The method of claim 15, further comprising:

receiving, by the device, a registration request for the respective kernel; and mapping, by the device, the application identifier to the respective kernel via the virtual kernel identifier based at least in part on the registration request.

18. The method of claim 15, wherein the virtual kernel identifier is a first virtual kernel identifier, wherein the application identifier is a first application identifier, wherein the configuration is a first configuration, wherein the first configuration for the respective kernel corresponds to the first application identifier, and wherein the method further comprises:

receiving, by the device, a registration request corresponding to a second application identifier;

determining, by the device, that second application identifier corresponds to the respective kernel with a second configuration; and mapping, by the device, a second virtual kernel identifier to the respective kernel with the second configuration, the second virtual kernel identifier to indicate that the respective kernel with the second configuration is to be utilized.

* * * * *